United States Patent
Calhoun et al.

(10) Patent No.: US 10,484,093 B2
(45) Date of Patent: Nov. 19, 2019

(54) OPTICAL INTERPOSER FOR ARRAY ANTENNAS

(71) Applicant: PRECISION OPTICAL TRANSCEIVERS INC., Rochester, NY (US)

(72) Inventors: David M. Calhoun, Victor, NY (US); Barrett Bartell, Mendon, NY (US)

(73) Assignee: Precision Optical Transceivers Inc., Rochester, NY (US)

( * ) Notice: Subject to any disclaimer, the term of this patent is extended or adjusted under 35 U.S.C. 154(b) by 0 days.

(21) Appl. No.: 15/878,060

(22) Filed: Jan. 23, 2018

(65) Prior Publication Data

US 2019/0229808 A1 Jul. 25, 2019

(51) Int. Cl.
| | |
|---|---|
| *H04B 10/2575* | (2013.01) |
| *H04B 10/25* | (2013.01) |
| *H01Q 3/26* | (2006.01) |
| *H01Q 21/00* | (2006.01) |

(52) U.S. Cl.
CPC ....... *H04B 10/2575* (2013.01); *H01Q 3/2676* (2013.01); *H01Q 21/0006* (2013.01); *H04B 10/2504* (2013.01); *H04B 2210/006* (2013.01)

(58) Field of Classification Search
CPC ............ H04B 10/2575; H04B 10/2504; H04B 2210/006; H01Q 21/0006; H01Q 3/2676
See application file for complete search history.

(56) References Cited

U.S. PATENT DOCUMENTS

| | | | |
|---|---|---|---|
| 4,739,334 A | 4/1988 | Soref | |
| 4,885,589 A | 12/1989 | Edward et al. | |
| 5,029,306 A | 7/1991 | Bull et al. | |
| 5,751,248 A * | 5/1998 | Thaniyavarn | ........ H01Q 3/2676 342/368 |
| 6,208,293 B1 | 3/2001 | Adams et al. | |
| 8,737,838 B2 * | 5/2014 | Adlerstein | ......... H01O 21/0006 398/115 |

(Continued)

OTHER PUBLICATIONS

Sugama, A., et al., "Development of High-Density Single-Mode Polymer Waveguides with Low Crosstalk for Chip-to-Chip Optical Interconnection," OSA Optics Express, 2013.

(Continued)

*Primary Examiner* — Leslie C Pascal
(74) *Attorney, Agent, or Firm* — Fox Rothschild LLP; Robert J. Sacco

(57) ABSTRACT

Feeding a plurality of antenna elements of an array antenna, involves receiving at a photonic substrate at least one transmit modulated optical carrier (TMOC) signal. The TMOC signal is communicated to an array level photonic integrated circuit (ALPIC) disposed on the photonic substrate where one or more optical processing operations are performed involving the TMOC signal to obtain a plurality of element-level optical carrier (ELOC) signals. These ELOC signals are communicated from the ALPIC to a plurality of conversion locations distributed on the photonic substrate. Photodetectors respectively provided at the conversion locations convert each of the ELOC signals to an element-level modulated radio frequency (ELMRF) signal. The ELMRF signal are coupled from each photodetector respectively to one of the plurality of antenna elements.

32 Claims, 12 Drawing Sheets

(56) References Cited

U.S. PATENT DOCUMENTS

| | | | |
|---|---|---|---|
| 9,507,111 B2 | 11/2016 | Collins et al. | |
| 9,614,280 B2 | 4/2017 | Shi et al. | |
| 2008/0111735 A1* | 5/2008 | Ridgway | G01S 7/03 342/200 |
| 2014/0010547 A1* | 1/2014 | Dong | H04B 1/04 398/116 |
| 2014/0126914 A1 | 5/2014 | Berlin et al. | |
| 2014/0231627 A1* | 8/2014 | Wakatsuki | H01Q 3/2676 250/208.2 |
| 2017/0294720 A1* | 10/2017 | Murakowski | H01Q 9/28 |
| 2018/0039154 A1* | 2/2018 | Hashemi | G02F 1/2955 |

OTHER PUBLICATIONS

Ross, D.D., et al., "Low-Profile High-Power Optically Addressed Phased Array Antenna," IEEE Journal of Lightwave Technology, Sep. 2017.

Fard, E., et al., "Relaxed Tolerance Adiabatic Silicon Coupler for High I/O Port-Density Optical Interconnects," Proceedings vol. 10106, Integrated Optics: Devices, Materials, and Technologies, 2017.

Righini, G.C., et al., "Glass Optical Waveguides: A Review of Fabrication Techniques," Optical Engineering 53(7), 071819 (Jul. 2014).

\* cited by examiner

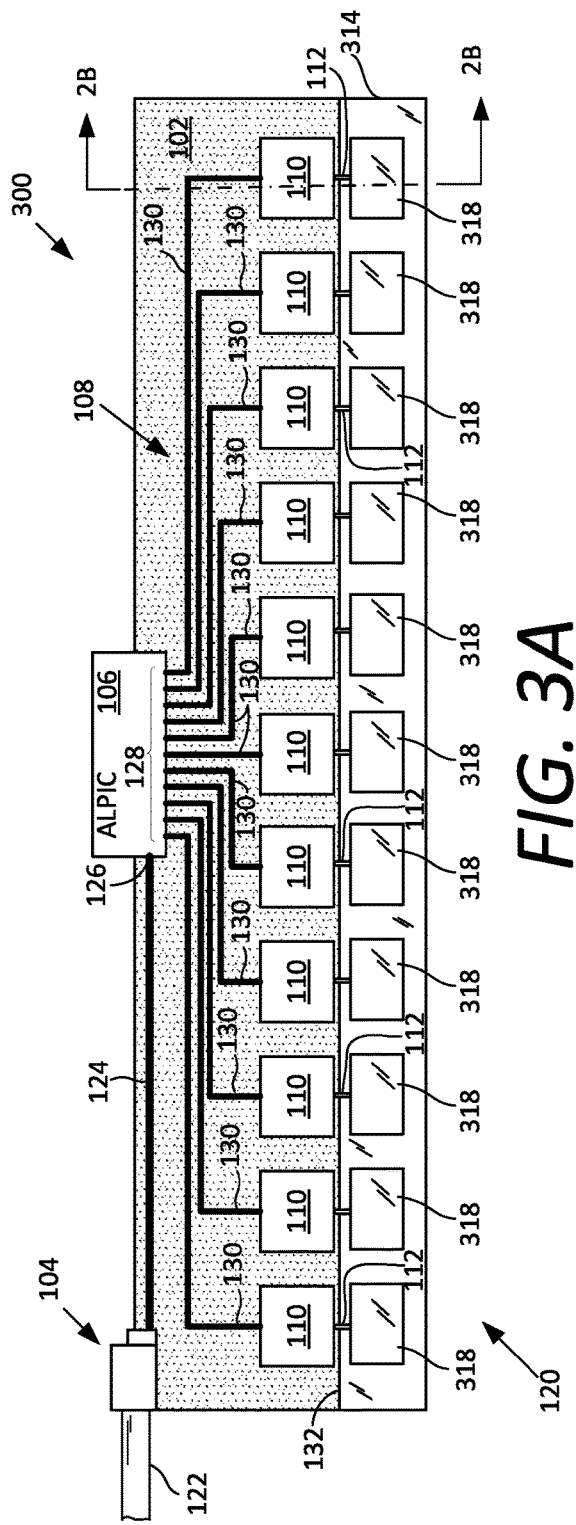
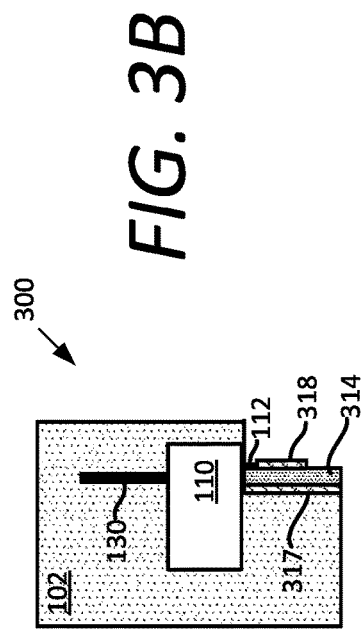
FIG. 3A
FIG. 3B

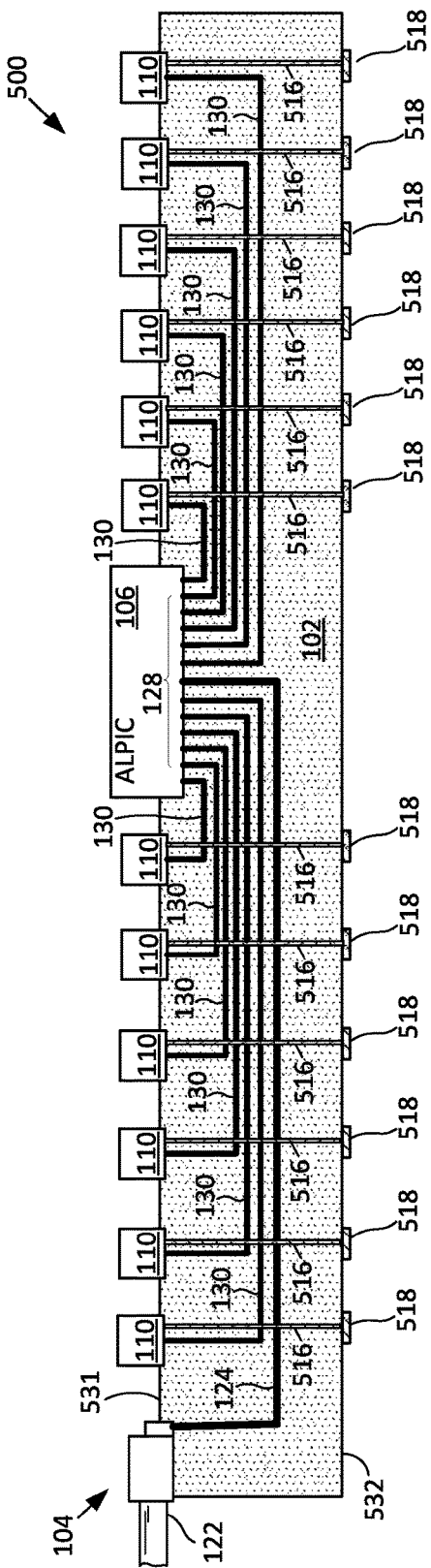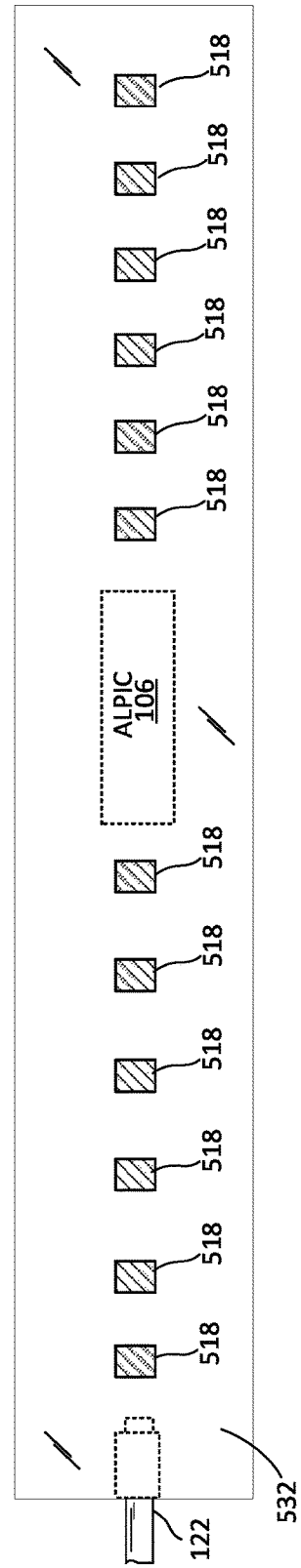
FIG. 5A
FIG. 5B

OPTICAL INTERPOSER FOR ARRAY ANTENNAS

BACKGROUND

Statement of the Technical Field

The technical field of this disclosure relates to antenna systems and more particularly to methods and systems for distributing signals to array elements used with microwave or millimeter wave antenna systems.

Description of the Related Art

As the demand for communication bandwidth continues to increase, many wireless providers are turning towards higher frequency carriers: microwave (3-30 GHz) or millimeter wave (30-300 GHz). However these higher frequency carriers suffer from greater free-space propagation loss. To mitigate these effects constructive interference between a plurality of antenna elements can be used to focus the electro-magnetic radiation in one direction and thus increase an amount of antenna gain achieved in a particular direction. Such systems are sometimes referred to as phased array antenna systems, or more simply as "phased arrays."

The design and implementation of phased array antenna systems is complex and involves many challenges. To facilitate signal distribution among a plurality of antenna elements, a corporate distribution structure can be used to interface between the signal source (or receiver) and multiple antenna array elements. As is known a corporate distribution structure (or corporate feed network as it is sometimes called) refers to an arrangement wherein the RF feed network is integrated with the radiating elements on the same substrate. The corporate distribution structure can comprise a distribution network (e.g., a branched network). Such a network feeds each antenna element of the array with signals from a transmitter/source, and directs received signals from each element of the antenna array to a common receiver node. In many scenarios, it is convenient to configure the corporate distribution structure so that the signals received at each antenna element from the same source will have the same phase and amplitude (unless otherwise varied by means of a phase/gain control element). Printed circuit board (PCB) technology is sometimes used for this purpose, in part because the components of the corporate distribution network, and the elements comprising the antenna array, can be conveniently miniaturized to facilitate fitment on a single or common PCB.

While a corporate distribution structure as described herein can preserve equal path length for all routes, it is known that the length and number of network branches can tend to degrade radio frequency (RF) signals. Ohmic, dielectric and radiative loss can all contribute to such signal degradation. Further, such losses can increase with the frequency of operation and the number of antenna elements. Although a PCB is most commonly used to perform this corporate signal distribution task, it is particularly sensitive to these loss mechanisms. When implemented electrically, such feed networks for array antennas also require co-location with all RF digital/analog components. This co-location requirement poses challenges with respect to form factor and only exacerbates the aforementioned signal integrity issues.

SUMMARY

This disclosure concerns an optical interposer which is useful to facilitate feeding a plurality of antenna elements associated with an array antenna. The interposer is comprised of a photonic substrate on which several components are provided. These components can include an optical interface which is configured to facilitate an optical communication link with a remote optical signal source. An optical signal source as described herein can provide a transmit modulated optical carrier (TMOC) signal to the optical interface (e.g., by means of an optical fiber communication link). Also included on the photonic substrate is an array level photonic integrated circuit (ALPIC) which is optically coupled to the optical interface. The ALPIC is configured to perform at least one optical processing operation. This optical processing operation can involve certain optical processing operations performed on the TMOC signal received at the optical interface. For example, these processing operations can involve optical processing that is useful for obtaining from the TMOC a plurality of element-level optical carrier (ELOC) signals. Each ELOC can comprise an optical carrier on which an RF signal (e.g., a microwave or millimeter wave RF signal) is modulated.

A plurality of element-level optical waveguides are also provided on the substrate. These waveguides are configured to optically couple the ELOC signals to a plurality of conversion locations distributed on the photonic substrate. Also disposed on the photonic substrate are a plurality of opto-electronic conversion devices, which are commonly known as photodetectors. More particularly, a photodetector is provided at each of the plurality of conversion locations. Each photodetector is configured to convert one of the ELOC signals to an element-level modulated radio frequency (ELMRF) signal. This is accomplished by extracting from the ELOC the RF signal which was modulated on the optical carrier. An output ELMRF signal of each photodetector is communicated to an RF coupling. Each of these RF couplings is configured to communicate an ELMRF signal respectively to one of a plurality of antenna elements. According to one aspect, the plurality of conversion locations can be coordinated so that each photodetector is disposed proximate to one of the plurality of antenna elements to which the ELMRF signal generated in the photodetector is coupled.

In some scenarios described herein, an ELMRF is coupled from each photodetector respectively to one of the plurality of antenna elements disposed in or on the photonic substrate. In other scenarios described herein, the ELMRF is coupled from each photodetector respectively to one of the plurality of antenna elements disposed on an RF substrate. The RF substrate can be disposed adjacent to the photonic substrate, and may be formed of a different substrate material as compared to the photonic substrate. In such scenarios, the photonic substrate and the RF substrate can be arranged so that they are included among a plurality of substrate layers which define a stack.

In some scenarios, the element-level optical waveguides can be configured to optically distribute the plurality of ELOC signals through a thickness of the optical substrate. For example, the optical waveguides can extend from the ALPIC disposed proximate to a first major surface of the photonic substrate, to the conversion locations disposed proximate to a second major surface of the photonic substrate and opposed from the first major surface. In such a scenario, the antenna elements can be disposed on or adjacent to the second major surface of the photonic substrate. In other scenarios described herein, the optical waveguides can be arranged to optically distribute the plurality of ELOC signals from an ALPIC disposed proximate to a first major surface of the photonic substrate, to conversion locations disposed on or adjacent to the first major surface.

The above-described coupling between the photodetector and the antenna element can involve using a radio frequency (RF) waveguide. In some scenarios, the RF waveguide can facilitate communication of the ELMRF signals through a thickness of the photonic substrate, from the conversion locations to an opposing major surface of the photonic substrate.

The method can further involve performing one or more antenna control operations to selectively cause a variation in at least one of a phase and an amplitude in at least one of the plurality of ELMRF signals. According to one aspect, the antenna control operation is performed in the optical domain. Also, in some scenarios disclosed herein, antenna control signal(s) are communicated to the control element using a common optical fiber through which the TMOC/RMOC signal is also communicated.

An optical interposer as disclosed herein can also configured to operate in a receive direction. In such scenarios, an optical modulator can be provided at each of the conversion locations. An optical modulator is an electro-optic conversion device that is configured to convert a receive ELMRF signal to a receive ELOC signals. A plurality of receive element-level optical waveguides are disposed on the substrate and configured to couple each of the receive ELOC signals to the ALPIC. The receive element-level optical waveguides may be the same as or different from the element-level optical waveguides used to distribute ELOC signals to the photodetectors in the transmit direction. In the receive direction, the ALPIC is configured to perform at least one optical processing operation on the plurality of receive ELOC signals. For example, such operation can involve combining the receive ELOC signals to form a receive modulated optical carrier (RMOC) signal based on the receive ELOC signals. These operations can also involve phase and/or amplitude adjustments to one or more of the receive ELOC signals.

BRIEF DESCRIPTION OF THE DRAWINGS

Embodiments will be described with reference to the following drawing figures, in which like numerals represent like items throughout the figures, and in which:

FIG. 3A is a plan view of a photonic media substrate and an associated RF substrate which is useful for understanding a first alternative embodiment of an optical interposer for array antenna feeding.

FIG. 3B is a cross-sectional view of a photonic media substrate in FIG. 3A, taken along line 3B.

FIG. 5A is a plan view of a photonic media substrate with integrated antenna array that is useful for understanding a third alternative embodiment of an optical interposer for array antenna feeding.

FIG. 5B is a bottom view of the photonic media substrate in FIG. 5A.

DETAILED DESCRIPTION

Figure 1A:
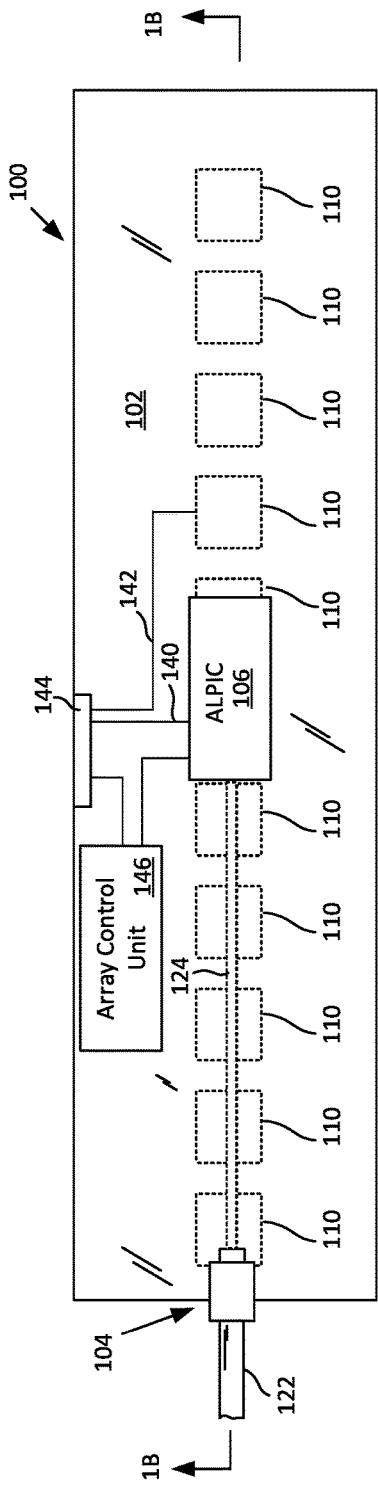
FIG. 1A is a plan view of a photonic media substrate and associated RF substrate which is useful for understanding an optical interposer for array antenna feeding with a 1×N array.

It will be readily understood that the components of the embodiments as generally described herein and illustrated in the appended figures could be arranged and designed in a wide variety of different configurations. Thus, the following more detailed description, as represented in the figures, is not intended to limit the scope of the present disclosure, but is merely representative of various scenarios. While the various aspects of the disclosure are presented in drawings, the drawings are not necessarily drawn to scale unless specifically indicated.

This disclosure concerns an optical feed network and associated methodology for microwave and millimeter wave array antennas. The optical feed network is comprised of photonic media for performing light transport using optical waveguide technology. The optical feed network is sometimes referred to herein as an optical interposer (OI) since it provides a physical construct which facilitates an interface between an optical communication device (such as an optical transmitter, receiver or transceiver) and a microwave or millimeter wave phased array antenna system).

According to one aspect, the OI is configured to accept individual optically modulated channels for each unique antenna element in the array antenna system. The OI is further configured to use the photonic media to distribute those signals optically through an optical waveguide distribution network. More particularly, the OI is configured to transport optical signals in an optical waveguide distribution network to optical-to-electrical (O/E) converters (photodetectors) so as to facilitate outgoing wireless emissions using RF signals. In some scenarios, an array of radio frequency antenna elements can be integrated with the optical media. However, in other scenarios the antenna elements can reside on a separate RF substrate. The OI disclosed herein also facilitates receive operations. More particularly, the OI is configured to generate optically-modulated signals using a plurality of electrical-to-optical (E/O) converters. Each of the E/O converters converts received RF energy from an associated element of the antenna array. The E/O converters are respectively disposed proximate to their associated elements of the antenna array so that electrical transmission line lengths are minimized. The OI transports the resulting optical signals from the E/O converters to a centralized optical signal processor for incoming wireless electrical reception.

The optical interposer disclosed herein solves a variety of problems associated with conventional feed networks used for microwave and millimeter wave antennas. For example, the system greatly reduces the electrical signal propagation length, thereby mitigating ohmic, dielectric, and radiative losses. Unlike conventional array feed systems, optical transport of signals through a fully integrated optical interposer (especially one which also incorporates electrical antennas elements in a single assembly) has the advantage of producing only minimal negative effects on transported signals. The system disclosed herein also achieves a more tightly integrated and mechanically simple solution insofar as it does not require one fiber per antenna element for optical feed/distribution. A further advantage of the system is its mechanical simplicity.

An optical interposer as disclosed herein can include support for optical primitives such as wavelength division multiplexing (WDM) and switching that replace functional aspects of traditional electrical feed networks. The methods and systems disclosed herein also facilitate support for wideband operation via RF transparency of optical signal transport and optical switching mechanisms. A further advantage is that the system can support the use of non-planar physical structures that are normally prohibitive with electrical PCB-based feed networks and array antennas.

Figure 1B:
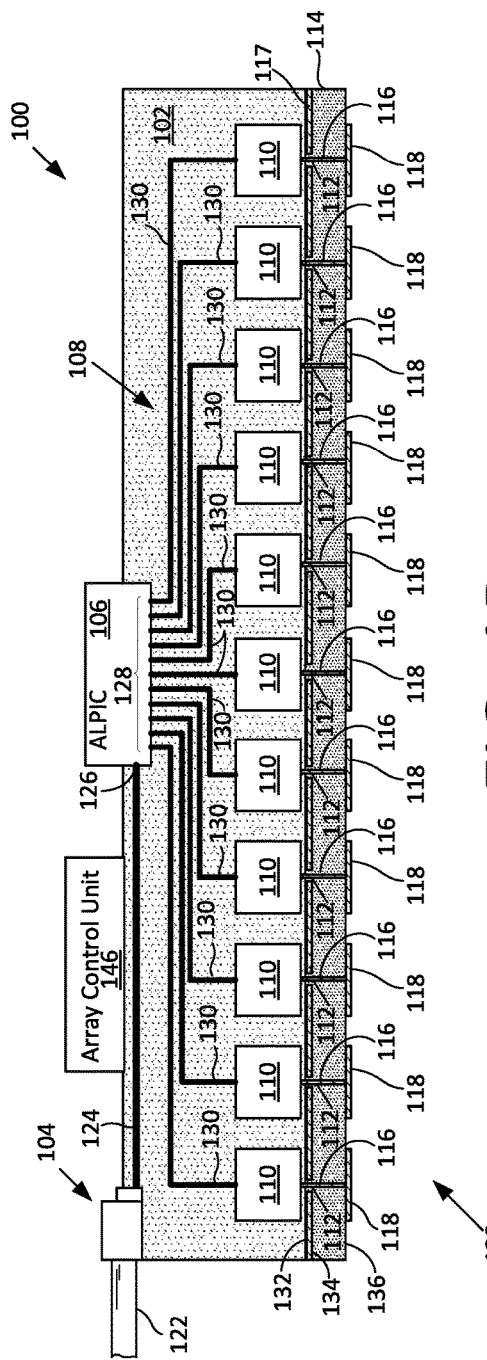
FIG. 1B is a cross-sectional view of the photonic media substrate and associated RF substrate in FIG. 1A, taken along line 1B.
Figure 1C:
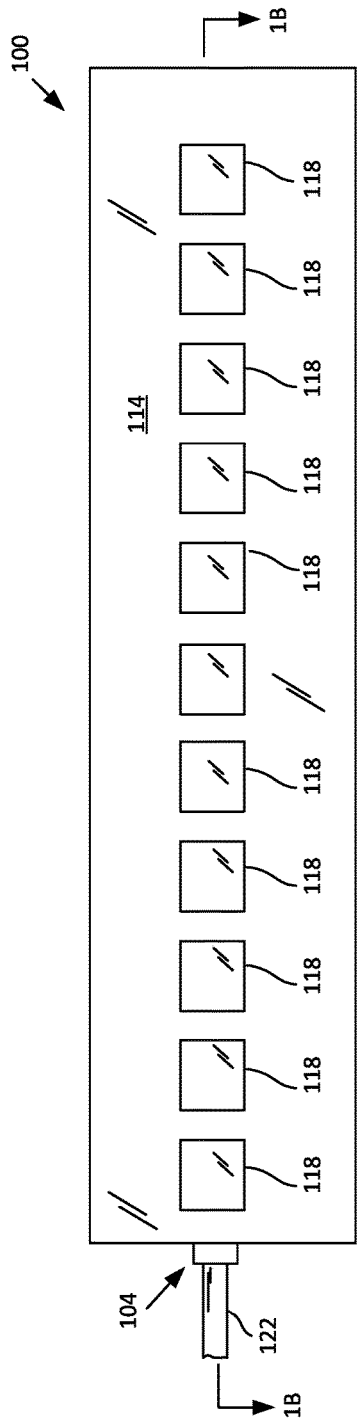
FIG. 1C is a bottom view of the RF substrate in FIG. 1A.

Referring now to FIGS. 1A-1C (hereinafter collectively referred to as FIG. 1), there is shown an OI 100 which is useful for understanding certain aspects of the present disclosure. In some scenarios disclosed herein the OI 100 is configured as a hybrid photonic integrated circuit (PIC) which includes a plurality of separate photonic integrated circuits disposed on a substrate. In a hybrid integration scenario different PICs can be fabricated on separate wafer substrates comprised of different materials. The various PICS can then be combined mechanically on the OI substrate to make the final device.

As is known, each PIC can contain multiple optically interconnected components which are fabricated on a particular substrate. These interconnected components function cooperatively to perform certain optical signal processing functions which are described below in greater detail. In conventional hybrid photonic systems, each PIC can be mounted on photonic substrate (e.g., photonic substrate 102) which comprises a photonic media in which optical waveguides are formed. The exact wavelength of the optical signals used herein is not critical. However, the wavelength can be selected so that it is suitable for operation given the material properties comprising each PIC and the photonic substrate 102. In some scenarios, the optical signals can be in the visible or near infra-red wavelength ranges.

As best shown in FIG. 1B, the substrate 102 supports various microphotonic components including an optical interface 104, an array-level photonic integrated circuit (ALPIC) 106, an optical waveguide distribution network 108, and a plurality of element-level photonic integrated circuits (ELPIC) 110. Each ELPIC 110 has an RF coupling port 112 configured to couple RF energy (e.g., microwave or millimeter wave RF signals) between an ELPIC 110 and an associated antenna element 118. The antenna elements 118 collectively comprise an antenna array 120 for transmitting and/or receiving RF signals. In FIG. 1 the array size is 1×N, where N is an integer value greater than 1. In FIG. 1 the value of N=11, but it should be noted that the number of array elements is not critical and embodiments are not limited in this regard.

Substrate 102 can be any substrate now know or known in the future which is suitable for integrated waveguide light transport and PIC device integration. Exemplary materials suitable for this purpose can include Lithium Niobate, Silicon (Si), glass, and polymeric materials. Other materials can include Silica, Gallium Arsenide (GaAs) or Indium Phosphide (InP) which are sometimes referred to as III-V compounds since they are composed of elements arranged in columns III and V of the periodic table. Various systems for integrating photonic waveguides and fabricating photonic integrated circuits (PICs) in a photonic substrate are well-known and therefore will not be described here in detail. However, it will be appreciated that such processes can involve various operations including activation (doping), epitaxial growth, waveguide etching, passivation and planarization, metallization and interconnect steps.

Glass is particularly well suited for use as a substrate material 102. As is known, optical waveguides formed in glass offer low propagation losses and good matching with respect to optical fibers. A discussion of optical waveguide fabrication methods using glass substrates is beyond the scope of this disclosure. However, the most basic requirement for confining the light in an optical waveguide is that the guiding material has a refractive index (RI) which is higher than the surrounding media. Fabrication techniques to facilitate this condition can involve one of two conventional approaches, including (1) deposition of a thin film on the glass substrate and (2) local modification of the bulk glass material. Deposition methods can involve radio frequency (RF) and magnetron sputtering and chemical vapor deposition methods, among others. Waveguide formation achieved by local modification of the bulk glass material is conventionally achieved by ion implantation, UV irradiation and femtosecond laser writing. Subsequent processing steps in such formation can involve annealing, photolithography and etching. These and other processes for optical waveguide formation in glass are discussed in various references such as Giancarlo C. Righini, Andrea Chiappini, "Glass optical waveguides: a review of fabrication techniques," Opt. Eng. 53(7) 071819 (14 Mar. 2014).

Integrated photonic waveguides formed on a substrate can be advantageous in certain scenarios, but it should be appreciated that other alternatives are also contemplated. For example, in some scenarios the one or more of the integrated optical waveguides can be implemented instead by using optical fibers which are secured to the glass interposer. In such scenarios, it is possible to forego index modification of a substrate (e.g. a glass substrate) to create optical waveguides, and instead take advantage of the precision machining aspect of glass, and use optical fiber as the actual signal transmission/routing mechanism. Such optical fiber can be secured to the substrate by any suitable means. For example, in some scenarios mechanical structures and/or adhesives can be used for this purpose.

The optical interface 104 is configured to facilitate an optical communication link between ALPIC 106 and a remote optical signal source (not shown in FIG. 1). In some scenarios, an array-level optical waveguide 124 can be provided in or on the optical substrate 102 to facilitate optical signal communication between the optical interface 104 and the ALPIC 106. In some scenarios, the array-level optical waveguide 124 can be fabricated using one or more of the fabrication techniques described above. The coupling between the array-level optical waveguide and the optical interface 104 can be facilitated by an optical spot size converter, such as an adiabatic taper (not shown). As is known, an optical spot size converter can ensure efficient optical coupling between an optical waveguide and an external optical fiber 122.

The ALPIC 106 is disposed on the substrate 102 and configured to perform one or more optical processing operations on one or more modulated optical carrier signals received at the optical interface 104. The ALPIC has an array-level optical port 126 to facilitate the optical communication with the optical interface 104, and a plurality of element-level optical ports 128 to facilitate optical communications with each of the ELPICs 110. The ALPIC 106 can also be configured to perform one or more optical processing operations on modulated optical carrier signals received from the ELPICs 110. The optical processing operations performed by the ALPIC will be described in greater detail below.

Each of the element-level optical ports 128 is coupled to a respective one of a plurality of element-level optical waveguides (ELOWs) 130 associated with the waveguide distribution network 108. In some scenarios, the ELOWs 130 can be fabricated in or on substrate 102 by using one or more of the fabrication techniques described herein. The ALPIC is configured so that it provides, at each of the element-level optical ports 128, a modulated optical carrier output having a wavelength which can be efficiently communicated by the ELOWs 130. At a waveguide end that is distal from the ports 128, each of the ELOWs is optically coupled to an optical communication port of an element level PIC or ELPIC 110.

Optical coupling between the waveguide elements 124, 130 and the PIC elements (ALPIC 106, ELPICs 110) can be facilitated by any suitable means. For example, in some scenarios the PIC elements can include integrated support for butt-coupling (optical coupling on the side of the PIC along the face of its thickness, or minor surface) or in a surface normal fashion (optical coupling on any broadside/major surface of the PIC such as its top-face or bottom-face). Each of the PIC elements can also include any necessary spot size converter components to facilitate optical coupling of the input/output ports of the PIC elements to the waveguide elements 124, 130.

Figure 1D:
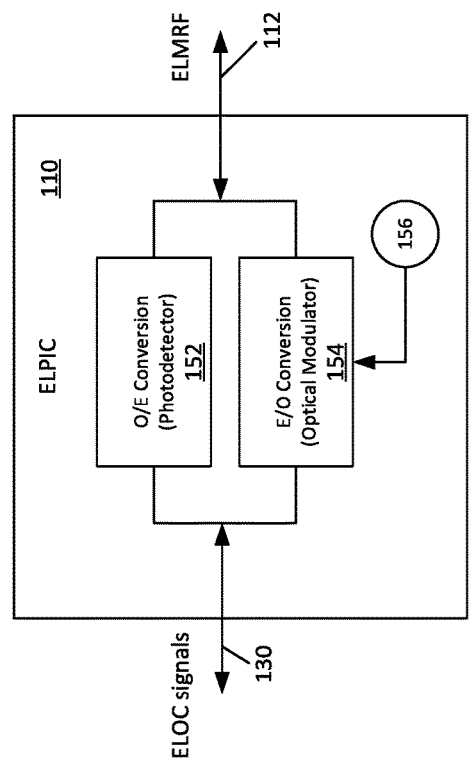
FIG. 1D is a block diagram of an ELPIC in FIGS. 1A and 1B.

As shown in FIG. 1D, each of the ELPICs 110 can include an optical to electrical (O/E) conversion device (e.g., a photodetector) 152 which is capable of recovering or regenerating an RF signal from an RF modulated optical carrier signal comprising an ELOC. As such, each ELPIC 110 is configured to receive the ELOC signal from ELOW 130 and convert the modulated optical carrier signal to an element level modulated RF (ELMRF) signal. The resulting ELMRF signal (e.g., a microwave or millimeter wave RF signal) is output from the ELPIC 110 at an RF coupling port 112 where it can then be communicated to a corresponding antenna element 118.

Each of the ELPICs 110 can also include an electrical to optical (E/O) conversion device or optical modulator 154. Each E/O conversion device is configured to use an RF signal (e.g. a microwave or millimeter wave RF signal) to modulate an optical carrier signal provided from an optical source 156. As such, each ELPIC 110 can receive through its coupling port 112 an RF signal originating from an antenna element 118, and use the RF signal to modulate the optical carrier signal. The ELPIC is configured so that the resulting modulated optical carrier has a wavelength which can be efficiently communicated by the ELOW 130. In some scenarios, both an OLE and E/O conversion device is included in the ELPIC.

In some scenarios disclosed herein, each of ALPIC 106 and the ELPICs 110 can be configured to facilitate bidirectional optical communications. More particularly, modulated optical carrier signal(s) received at optical interface 104 can be communicated from the optical interface to the ALPIC 106, and modulated optical carrier signals from the ALPIC 106 can be communicated to the optical interface 104. Similarly, modulated optical carrier signal(s) can be communicated from the ALPIC 106 to each of the ELPICs 110 using the ELOWs 130. These signals are sometimes referred to herein as transmit element level optical carrier (ELOC) signals. Modulated optical carriers generated at the ELPICs 110 can be communicated through the ELOWs 130 to the ALPIC 106. These signals are sometimes referred to herein as receive ELOC signals. The transmit and receive ELOC signals are sometimes referred to collectively herein as ELOC signals.

Any suitable technique can be used to facilitate the bidirectional optical communications described herein. In some scenarios, a plurality of optical waveguides can be provided between each PIC to facilitate separate paths for receive and transmit operations. In other scenarios, these bidirectional communications can be facilitated by wavelength division multiplexing (WDM). WDM methods are well-known and will not be described here in detail. However, it will be appreciated that such methods involve concurrently communicating two or more different optical carrier signals using the same optical transmission medium (e.g., array-level optical waveguide 124, ELOWs 130). In the context of bi-directional communications, WDM involves using optical carriers of different wavelengths respectively for receive and transmit operations so that the two signals can be separated at a receiving end of the communication link. Of course, if bidirectional communications are facilitated using WDM, then each of the PICs described herein will require suitable optical components (e.g. an optical diplexer) integrated therein to facilitate the separation of multiplexed optical carriers of different wavelengths.

AS shown in FIG. 1B, each ELPIC 110 is advantageously located in close proximity to a corresponding antenna element 118 to which it is coupled. Consequently, the O/E and/or E/O conversion devices contained therein will also be in close proximity to the antenna element 118. The location of the O/E and E/O conversion devices define a conversion location where optical signals are converted to electrical signals and vice versa. RF signals communicated from an ELPIC 110 to a corresponding antenna element are sometimes referred to herein as transmit element-level modulated radio frequency (ELMRF) signals. RF signals communicated from an antenna element 118 to a corresponding ELPIC 110 are sometimes referred to herein as receive ELMRF signals. Collectively, these types of signals are sometimes referred to herein as ELMRF signals. A plurality of RF couplings are provided to communicate the ELMRF signals respectively between the plurality of photodetectors and the plurality of antenna elements.

The close proximity of the O/E and E/O conversion devices to the antennas is advantageous as it minimizes any degradation of RF signals communicated between the ELPIC 110 and the antenna element 118. As used herein, close proximity can refer in some scenarios to an electrical distance which is less than one wavelength at the RF operating frequency for which the antenna element is designed. As will be appreciated by those skilled in the art, the exact physical distance corresponding to such electrical distance can depend on the physical characteristics (e.g., permittivity) of the substrate material through which the RF signal is transmitted. Of course embodiments are not limited with regard to the exact distance between each ALPIC and its corresponding antenna element to which it is coupled. Other scenarios are also possible where the antenna elements are located a greater distance away from the ELPIC 110. For example, instead of being located within one wavelength, the ELPIC could be located less than 10 wavelengths from its corresponding antenna 118. Greater distances are also possible; however it should be understood that the benefits of the interposer diminish with increasing distance between the ELPIC 110 and the antenna element 118.

In FIG. 1, the antennas elements 118 which comprise the antenna array 120 can be any type of antenna element that is suitable for microwave and/or millimeter wave RF. In some scenarios, the antenna elements are comprised of microstrip devices disposed on an RF substrate 114. As such, the antenna elements can be planar and formed of a highly conductive material, separated by the thickness of the substrate from a conductive metal ground plane 117. Conventional fabrication techniques can be applied to facilitate formation of conductive elements, such as the ground plane and/or the antenna elements. For example, physical vapor deposition (PVD), sputtering and/or resistive evaporation are standard methods of producing thin metal films on substrates. These and other methods can be used to produce the metal layers described herein for the antenna elements and RF waveguides.

In some scenarios, the antenna elements and ground plane can be comprised of copper (Cu). In other scenarios (e.g., when the metallization layer is a topmost layer) gold (Au) can be used as the top layer of metallization to improve the performance of the antenna elements. The array antennas in some scenarios can comprise conventional patch antennas formed of a metal such as copper. However, many different types of microwave and millimeter wave antenna elements are known in the art and all such element types (whether now known, or known in the future) are contemplated for use herein.

The RF substrate 114 can be any substrate material that is suitable for circuits involving microwave and/or millimeter wave RF signals. For example, the RF substrate in some scenarios can be comprised of a commercially available resin-based dielectric material. Examples of such materials can include ceramic filled polytetrafluoroethylene (PTFE), ceramic filled hydro-carbon thermoset, ceramic filled engineered thermoplastic, and unfilled Liquid Crystal Polymer (LCP). Of course other substrate material types are also possible and the foregoing are provided merely by way of several possible alternatives.

Dielectric thickness of the RF substrate is advantageously maintained at less than $\frac{1}{8}\lambda$ (where $\lambda$ is the wavelength of RF signals to be communicated using the antenna elements 118). However, this dimension is not critical and other substrate thicknesses are also possible. The thickness of the conductive material forming the antenna elements and the conductive metal ground plane are not critical, but will generally be less than about 50 µm. For example, at millimeter wave frequencies, the conductor thickness can be in the range of about 12 µm.

In some scenarios the photonic substrate 102 and the RF substrate 114 are each planar elements with opposing major surfaces. The RF substrate can have the conductive metal ground plane 117 disposed on one of the major surfaces. As shown in FIG. 1B, a major surface 134 of RF substrate 114 can be disposed adjacent to a major surface 132 of the photonic substrate 102 such that the two substrates can form a stack of planar materials. In such a scenario, antenna elements 118 can be disposed on a major surface 136 of the RF substrate which is opposed from the major surface 134. Conductive vias 116 can define RF waveguides or transmission lines. These RF transmission lines can extend through apertures formed in the ground plane 117, and through the thickness of the substrate, to facilitate transmission of RF energy between each ELPIC 110 and its corresponding antenna element 118. Electrical connections between the RF coupling ports 112 and the conductive vias 116 can be facilitated by a mechanical contact or any other suitable means.

Figure 2:
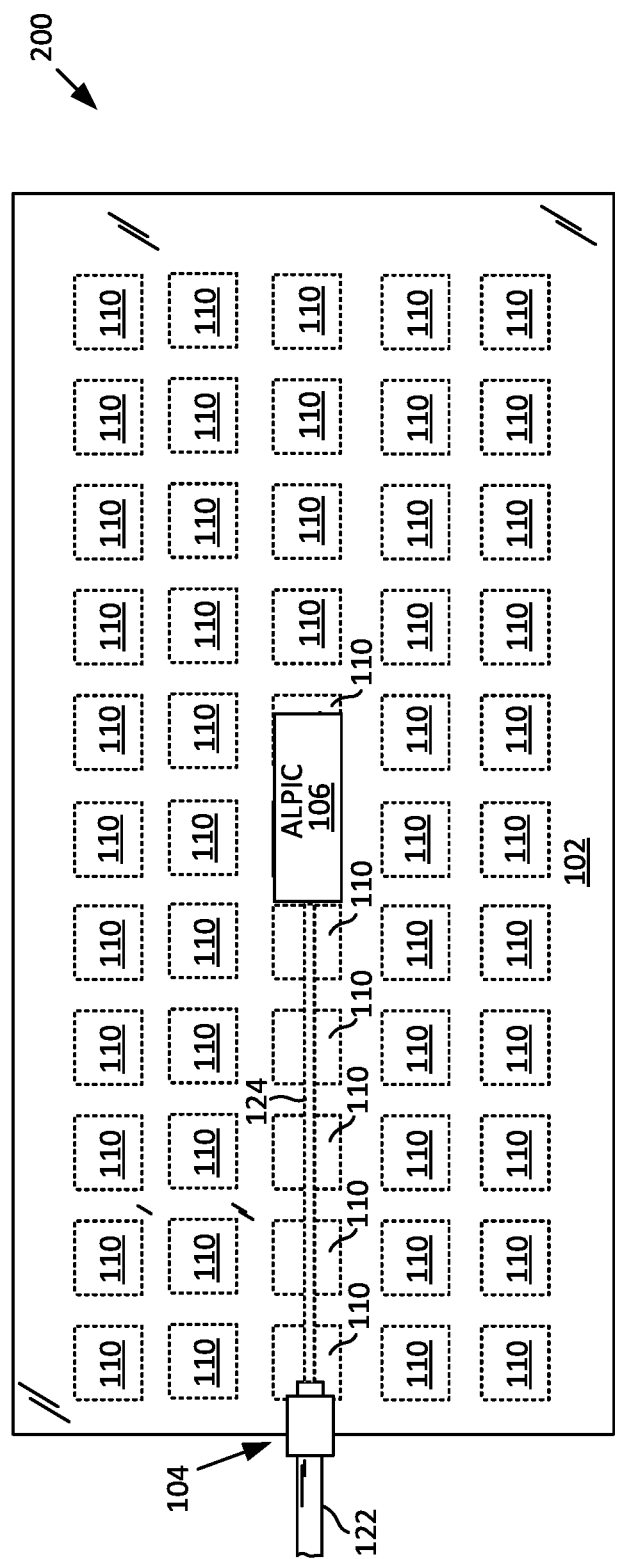
FIG. 2 is a plan view of a photonic media substrate which is useful for understanding how the concept illustrated in FIGS. 1A-1C can be extended to a two-dimensional array of M×N elements.

It may be observed that the antenna array size in FIG. 1 is 1×N. However, this basic concept can be extended to a two-dimensional array of M×N elements, where M and N are both integer values greater than one. An OI 200 comprising a two-dimensional array as described is shown in FIG. 2, where like components of an OI 200 are indicated with the same reference numbers as in FIG. 1. To facilitate greater clarity in the drawing, the optical waveguide distribution network is not shown in FIG. 2. However, it will be appreciated that a plurality of ELOWs 130 would be provided in FIG. 2 to communicate ELOC signals between the ALPIC 106 and each of the ELPICs 110. Likewise, each of the ELPICs 110 in FIG. 2 would have an associated antenna element 118 disposed in a manner similar to that which is shown in FIG. 1. These antenna elements 118 are intentionally omitted in FIG. 2 so as to facilitate greater clarity in the drawing.

Embodiments are not limited to the stacked arrangement shown in FIG. 1. For example, FIGS. 3A and 3B (collectively FIG. 3) show an alternative scenario in which like components of an OI 300 are indicated with the same reference numbers as in FIGS. 1 and 2. In FIG. 3, RF substrate 314 and antenna elements 318 are similar to the RF substrate 114 and antenna elements 118 FIG. 1. But in the scenario shown in FIG. 3, the substrate 314 and antenna elements 318 are disposed in a plane which is orthogonal to the major surface 132 of the photonic substrate 102. In some scenarios, the RF substrate 314 can be supported on a portion of the photonic substrate 102 as illustrated in FIG. 3B. Substrate 314 can include a ground plane 317 in some scenarios to support the operation of the antenna elements 318. Suitable electrical connections between the RF coupling ports 112 and the input to the antenna elements 318 can be facilitated by wirebonding, ball bonds, mechanical contact or any other suitable means.

Figure 4A:
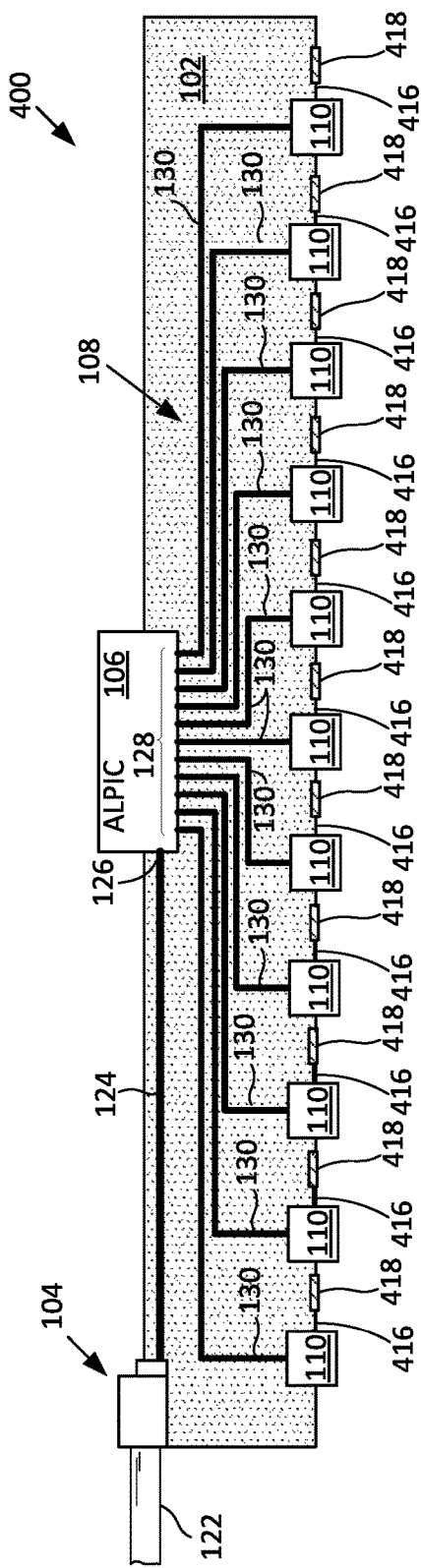
FIG. 4A is a plan view of a photonic media substrate with integrated antenna array that is useful for understanding a second alternative embodiment of an optical interposer for array antenna feeding.
Figure 4B:
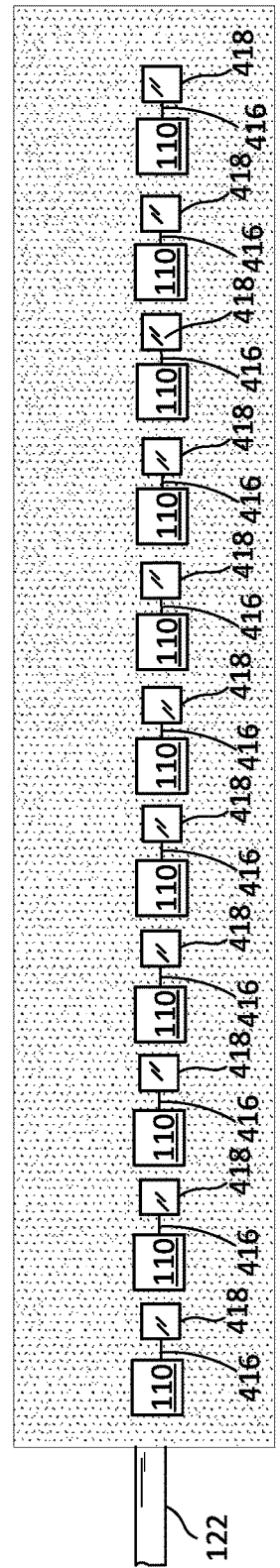
FIG. 4B is a bottom view of the photonic media substrate in FIG. 4A.

A further alternative embodiment is shown in FIGS. 4A and 4B (collectively FIG. 4), where like components of an OI 400 are indicated with the same reference numbers as in FIGS. 1-3. In the embodiment shown in FIG. 4, antenna elements 418 comprising an array are not disposed on a distinct RF substrate but are instead directly integrated in or on the photonic substrate 102. RF transmission lines 416 can be provided to facilitate communication of RF energy between the RF coupling port of each ELPIC 110 and its corresponding antenna element 418. Examples of suitable RF transmission lines which can be used for such purpose include stripline, microstrip and coplanar waveguide (CPW). Of course, embodiments are not limited in this regard and any other suitable type of RF waveguide can also be used for this purpose. In FIG. 4, the antenna elements 418 can be disposed on the surface of the substrate 102 as shown but it should be understood that various other configurations are also possible. For example, the antenna elements 418 can optionally be embedded within the photonic substrate 102 instead of being disposed on the surface of the substrate. To facilitate antenna operations, a ground plane 417 can optionally be disposed behind the antenna elements 418. Planar transmission lines tend to be lossy at higher microwave and millimeter wave frequencies. For this reason each antenna element is advantageously disposed in close proximity to RF coupling port of its corresponding ELPIC 110.

The arrangement shown in FIG. 4 can facilitate a completely integrated design in which the antenna array is fully integrated with the photonic media. There are several advantages to this approach. For example, the embodiment in FIG. 4 is a simplified mechanical design and results in a complete antenna system that is more robust. The approach shown in FIG. 4 also avoids any potential problems associated with electrical connections between the RF coupling ports 112 and the antenna elements. A further advantage is that it has the potential to reduce manufacturing cost, particularly in a monolithic implementation where the antenna elements 418 can be formed in the optical media concurrently with the PICs and no separate RF substrate is required. A further advantage of the approach described with respect to FIG. 4 is that it reduces the likelihood of phase and gain variations in the RF coupling between ELPIC 110 and the antenna elements 418.

In a scenario shown in FIG. 4, the material selected for the photonic substrate can be chosen so that it is also suitable for the RF components including the RF waveguides 416 and antenna elements 418. One example of such a substrate material is silicon. In some scenarios, each of the antenna elements 418 can comprise a conventional planar antenna element such as a patch antenna. Accordingly, the RF substrate material is advantageously selected so that suitable metallization layers can be provided to facilitate such structures.

It can be observed in FIG. 4 that the antenna elements 418 are disposed in the photonic substrate 102 adjacent to the ELPICs 110. However, embodiments are not limited in this regard and other scenarios are also possible. For example, FIGS. 5A and 5B (collectively referred to herein as FIG. 5) shows a scenario in which like components of an OI 500 are indicated with the same reference numbers as in FIGS. 1-4. The OI 500 is similar to the embodiment shown in FIG. 4 insofar as antenna elements 518 comprising an array are directly integrated in or on the photonic substrate 102. Likewise, RF transmission lines 516 which facilitate communication of RF energy between the RF coupling port of each ELPIC 110 and its corresponding antenna element 518 are also integrated directly into the photonic substrate. However, in OI 500 all PICs associated with the OI (including e.g., ALPIC 106 ELPICs 110) are advantageously disposed on the same major surface 531 of the photonic substrate 102. Similarly, all of the antenna elements 518 are disposed on an opposing surface 532. Conductive vias and/or copper pillars extending between the ELPICs 110 and the antenna elements are configured to serve as RF transmission lines 516. These transmission lines facilitate communication of RF energy between each ELPIC 110 and its corresponding antenna element 518. The arrangement shown in FIG. 5 can be useful in some scenarios to facilitate certain processing steps associated with OI fabrication.

From the foregoing description it will be understood that the ALPIC 106 and the ELPICs 110 can be placed on any major surface of the interposer. It should also be understood that the waveguides (including the array-level waveguide 124 and the element-level waveguides 130) can be placed similarly and/or may extend on or through the substrate. Consequently different optical coupling methods are possible beyond those which are expressly described herein and all such optical coupling methods are intended to be included within the scope of the disclosure, whether such methods are now known or known in the future. As an example, another scenario could include ELPICs 110 entrenched in the surface of 102, with all butt-coupled waveguides coming out of the ALPIC and going to all ELPICs 110.

In FIGS. 1-5 the OI can further comprise one or more electrical conductors. These electrical conductors can be disposed in or on the photonic substrate to facilitate distribution of electrical power and/or control signals to one or more components such as the ALPIC and the ELPICs. In FIG. 1, two of these electrical conductors 140, 142 are shown. To avoid confusion in the drawing, electrical conductors are shown only for the ALPIC 106 and a single ELPIC 110. However, it should be appreciated that this is for purposes of illustration only. In practice electrical power and/or control lines could be provided for any or all of the PICs disposed on a photonic substrate as disclosed herein.

Figure 12:
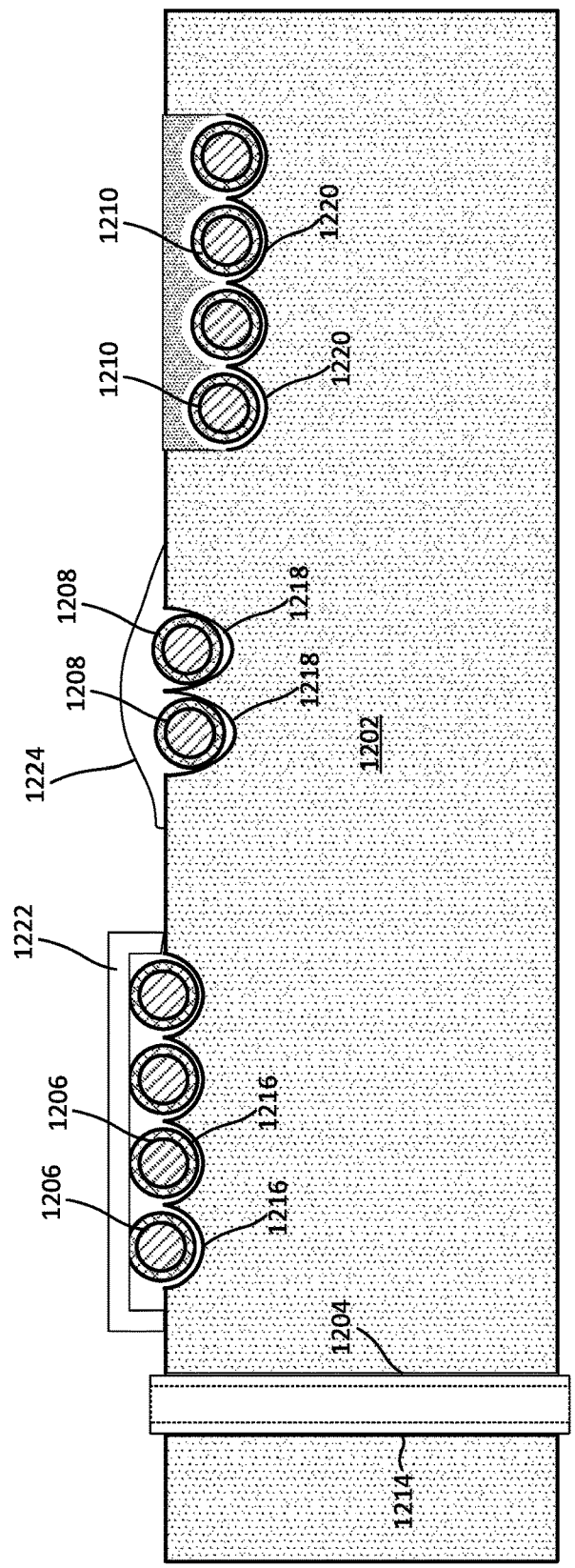
FIG. 12 is a drawing that is useful for understanding an alternative approach for implementing optical communications in or on an optical interposer substrate.

The various optical interposer designs which are shown and described in FIGS. 1-5 can use suitable optical waveguides to facilitate optical signal distribution. These optical waveguides can be integrated in the substrate 102 using one or more of the fabrication techniques described herein. However, it should be appreciated that in some scenarios one or more of the optical signals in those embodiments can be distributed within or on the substrate by alternative means. For example, an alternative embodiment optical interposer shown in FIG. 12 can include one or more optical transmission elements 1204, 1206, 1208, 1210 which are formed of optical fibers. A substrate 1202 is comprised of a suitable material such as glass, where the substrate has been machined or otherwise formed with trenches 1216, 1218, 1220 or bores 1214. The trenches and/or bores can be configured to hold unsheathed but still clad optical fibers 1204, 1206, 1208, 1210. For example, optical fiber having a 125-micron pitch could be used for this purpose. Of course embodiments are not limited in this regard and other fiber pitches are also acceptable.

The optical fibers described herein can be secured in place within the trenches by mechanical retention elements 1222, adhesives 1224 and/or by backfilling 1226. Materials suitable for these purposes can include epoxy, resins and so on. In this way, the optical interposer can hold optical fiber in trenches to achieve the same effect as the ion-etched optical waveguides in previous embodiments. This makes achieving turns/bends more difficult from a practical perspective and from a performance perspective, but otherwise offers the potential to improve the quality of the optical waveguides. The optical fibers can be used to facilitate optical transmission links associated with one or more an array-level optical waveguide 124 and/or ELOWs 130.

As is known, antenna array beamforming operations can involve causing a variation in at least one of a phase and an amplitude of at least one ELMRF signal which is transmitted using the antenna elements. Likewise, the antenna array beamforming operations can involve carefully controlled phase and amplitude adjustments to received ELMRF signals which are communicated to radio receiving equipment. For purposes of the optical interposers disclosed herein, these adjustments can be facilitated by any suitable means.

Figure 6:
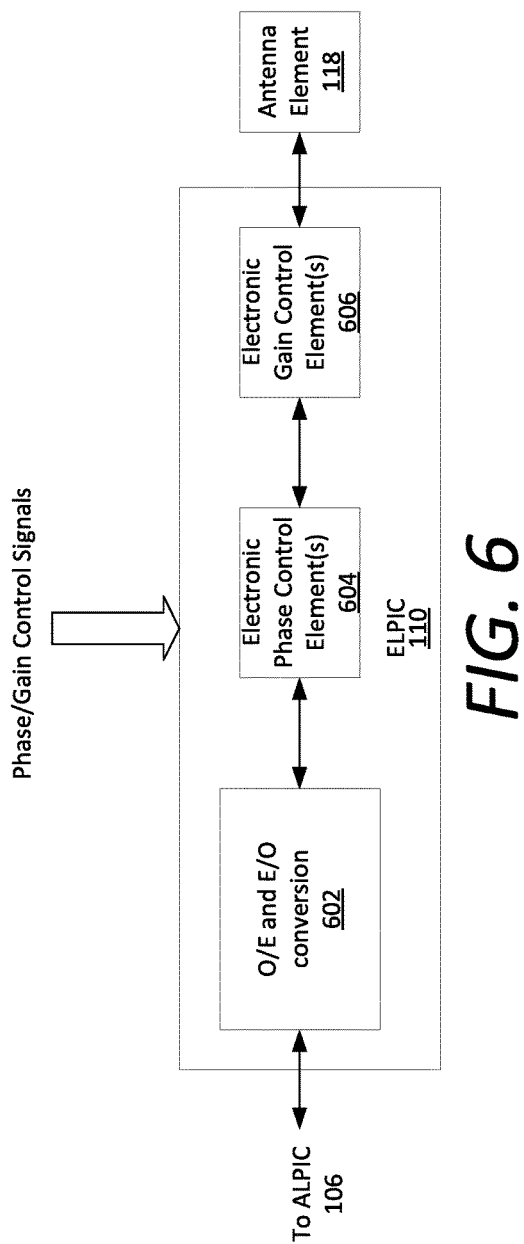
FIG. 6 is a block diagram that is useful for understanding an ELPIC which includes electrical phase and gain control elements.

In its simplest form the optical interposed disclosed herein could involve passive steering and beamforming whereby phase and/or gain of ELMRF signals are fixed. In such scenarios, the antenna system could conceivably be purely passive and could potentially be implemented without a control unit. However, in other scenarios electronic control signals applied to the ELPICs 110 could be used to apply phase and/or gain adjustments to ELMRF signals. As shown in FIG. 6, these functions can involve electronic phase shift component 604 and electronic gain adjustment component 606. These antenna beam forming control components can be disposed in the ELPIC 110 so they are situated between the O/E, E/O conversion elements 602 of each ELPIC and its corresponding antenna element 118. Electronic phase and gain adjustment techniques are well-known in the art and therefore will not be described here in detail. However, it should be appreciated that any method now known, or known in the future, for controlling such signal characteristics can be used.

Other embodiments of an ELPIC 110 could put the phase and gain control elements in between the optical interfaces 128 of the ALPIC 106 and the O/E and E/O conversion block 602 so that these operations are performed in the optical domain. Such an arrangement can facilitate a decentralized optical domain-based approach to phase and gain control. Implementation of such phase and gain control in the optical domain is discussed below in further detail. Finally, it should be noted that the ELPIC could contain other elements to facilitate array operations. For example, the ELPIC 110 could include electrical RF power amplifiers for substantially increasing an RF power output of the array for purposes of transmit operations. These RF power amplifiers can be different from the electronic gain control elements 606 which are mainly provided to facilitate beam-forming operations. In some scenarios, it can also be advantageous to include electronic low noise amplifiers (LNAs) in the receive path to facilitate receive operations in the electrical or RF domain.

Coordination of the phase and gain adjustments applied to the signals associated with each antenna element 118 can be implemented by a suitable control system. In some scenarios, the control system can be a separate computing system (e.g. a general purpose computing system which communicates with the OI through an electronic interface (e.g. electronic interface 144). In other scenarios, the control system can involve one or more control devices which are included as part of the OI. Such a control system can be comprised of an array control unit 146 which can be separate from or integrated with the ALPIC 106. The array control unit 146 can include a microprocessor, controller an application specific circuit, a programmable logic device, a digital signal processor, or other circuit programmed to facilitate the beam forming control functions. A control device as described herein may be a digital controller, an analog controller or circuit, an integrated circuit (IC), a microcontroller, formed from discrete components, or the like. In some scenarios, the array control unit 146 can reside directly on the photonic substrate 102 to facilitate such control operations. In some scenarios the array control unit 146 can function cooperatively with a separate computing system remote from the OI and/or a further control component included in the ALPIC and or the ELPICs 110.

In an alternative scenario, the ALPIC and/or the ELPIC can be responsive to at least one control signal to facilitate beam forming operations in the optical domain. These beam forming operations can involve indirectly causing a variation in at least one of a phase and an amplitude in at least one of the plurality of ELMRF signals by independently controlling a phase and/or gain of each element level optical carrier (ELOC) signal. As explained below in further detail, these types of indirect phase and gain adjustment to the ELMRF signals can be implemented using a phase control ring and an optical attenuator. These optical components (which may be disposed in the ALPIC or ELPIC) can modify an ELOC, so as to indirectly cause phase and/or gain variations to the RF signal which has been modulated on the optical carrier.

Figure 7:
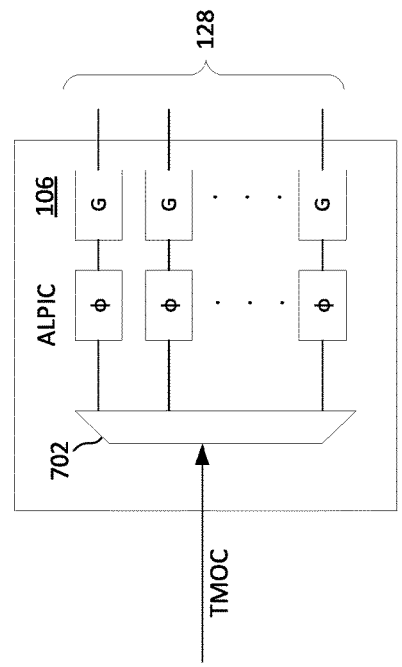
FIG. 7 is a simplified block diagram that is useful for understanding a configuration of an ALPIC.

For example, FIG. 7 is a simplified block diagram that shows a transmit only scenario in which an ALPIC 106 receives a transmit modulated optical carrier signal (e.g., by means of optical fiber 122). The transmit modulated optical carrier signal can be remotely generated using a microwave or millimeter wave RF signal to modulate the optical carrier. The modulated optical carrier signal is split in the ALPIC 106 using an optical splitter 702 into a plurality of separate optical channels (e.g., one channel for each antenna element 118). Each channel includes associated phase ($\phi$) and gain (G) adjustment components which function in the optical domain to indirectly control a phase/gain of ELMRF signals which are communicated to the antenna elements 118. A similar approach can be applied in the receive direction. In some scenarios WDM (not shown in FIG. 7) can be used to facilitate transmit and receive modulated optical carriers on a single optical fiber 122. Of course, other methods to facilitate bidirectional communications can also be used. Details of this technique are described below with reference to FIGS. 8-11.

Figure 8:
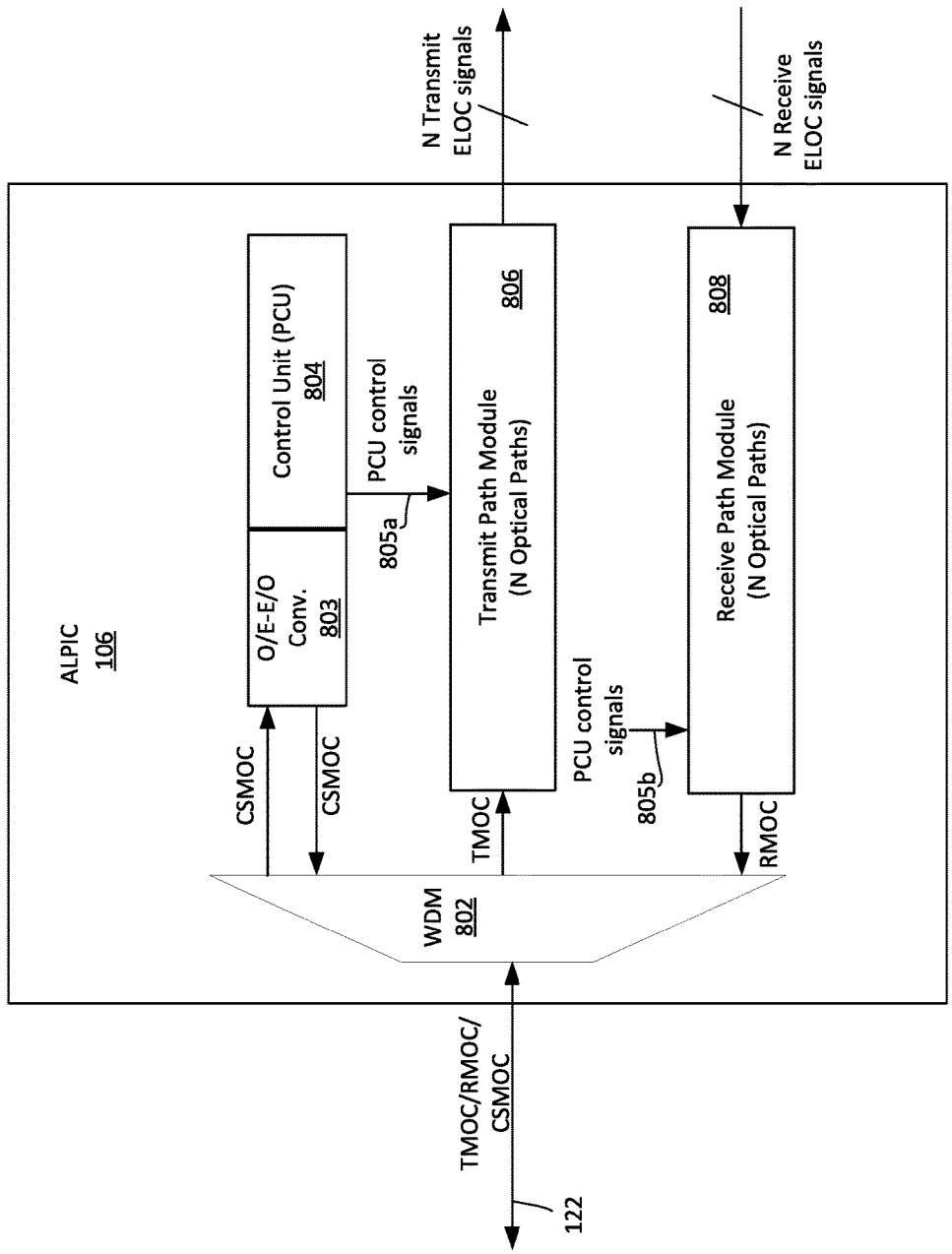
FIG. 8 is a detailed block diagram of an example architecture for an ALPIC.

As shown in FIG. 8 an ALPIC 106 can be comprised of a transmit path module (TPM) 806 and a receive path module (RPM) 808. The ALPIC can also include a photonic control unit (PCU) 804. In some scenarios, the PCU can serve as the array control unit 146 described in reference to FIG. 1. Alternatively, the PCU 804 can be a separate control element which operates in conjunction with the array control unit 146.

Each of the TPM 806 and the RPM 808 is comprised of a plurality of optical channels (not shown in FIG. 8). In some scenarios, the number of optical channels in each of the TPM 806 and the RPM 808 can be matched to the number of antenna elements in the antenna array. Accordingly, if the antenna array is comprised of N antenna elements, then the TPM 806 and the RPM 808 can each comprise N optical channels. The ALPIC can also include an optical multiplexer (e.g., a wavelength division multiplexer or WDM) 802. The WDM 802 can facilitate multiplexed communication of both a transmit and receive modulated optical carrier on the optical fiber 122. Additional detail concerning the TPM 806 and RPM 808, including their purpose and function, is provided below with reference to FIGS. 9-11.

In some scenarios control signal communications with the PCU 804 can be facilitated by an electronic interface (e.g. an electronic interface 144) as shown in FIG. 1. However, it can be advantageous to avoid the need for these additional communication links and instead facilitate the control signal communications by using one or more modulated optical carrier signals communicated over the optical fiber 122. These one or more control signal modulated optical carriers (CSMOC) can be communicated in optical fiber 122 concurrently with a transmit modulated optical carrier (TMOC) and/or a receive modulated optical carrier (RMOC). The individual optical signals (TMOC, RMOC, and CSMOC) can be extracted at the ALPIC 106 by using wavelength division multiplexing facilitated by WDM 802. The CSMOC signals are optical carriers that are modulated with signal data (e.g., digital signal data) to carry control signal information. As such, the CSMOC signals can include phase and gain control for array steering/beamforming, test signals and any other signal data necessary or useful to facilitate control of the array. It is anticipated that such control signals will be at a much lower data rate as compared to the RF optical signals.

The optical control signal can be converted to electronic digital data in an O/E-E/O conversion unit 803. The converted digital data control signals can then be provided to the PCU 804. The optical control signaling can be one directional but in other scenarios, can be bidirectional. As such, the optical signaling channels can also be used to communicate from the array any type of performance data, self-test data, fault data, acknowledgement data, and so on. In the scenario shown in FIG. 8, the PCU 804 is integrated with the ALPIC 106 but it should be understood that in other scenarios the PCU 804 can comprise a separate entity disposed on the substrate 102.

Figure 9:
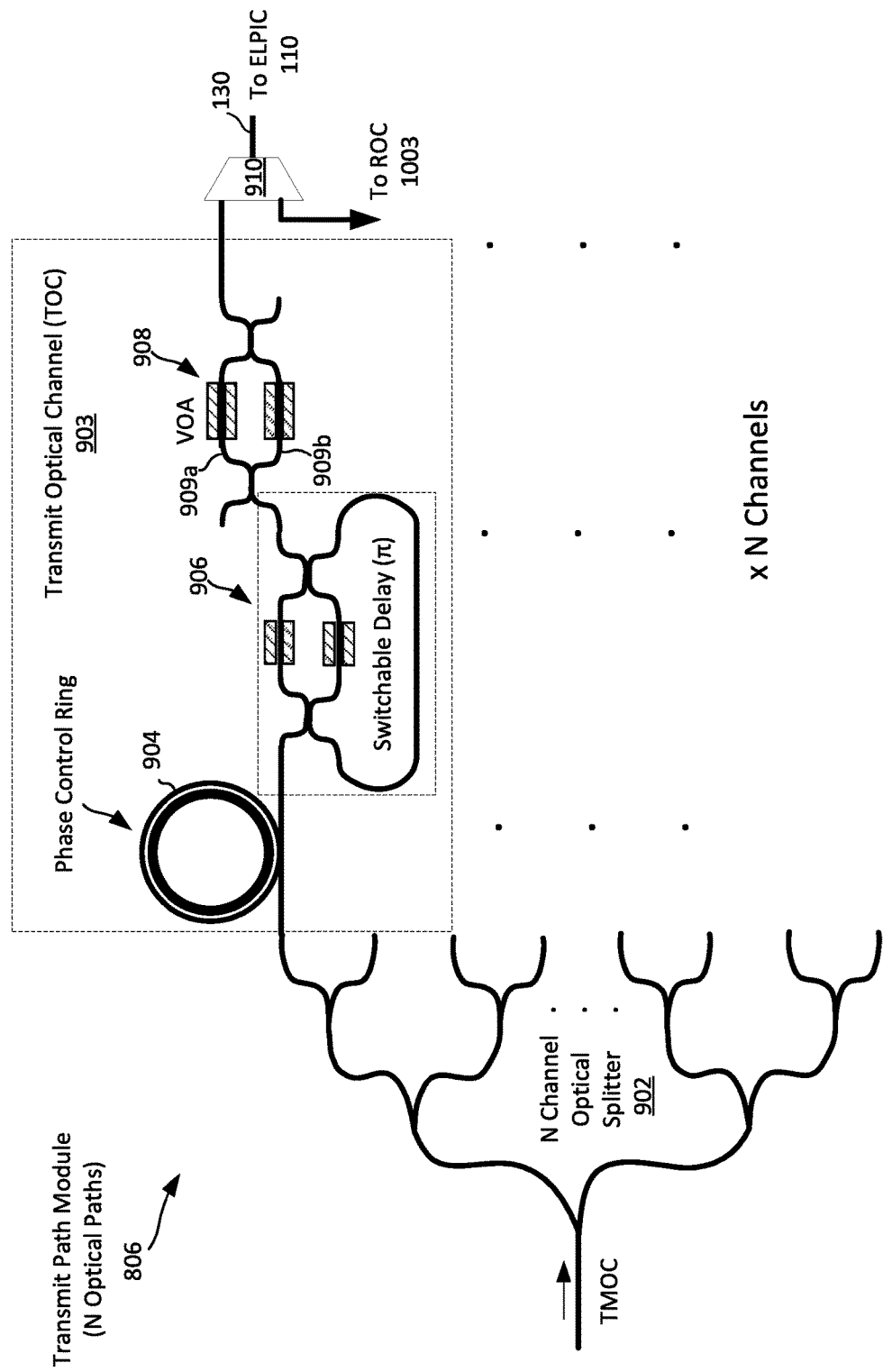
FIG. 9 is a detailed block diagram of a transmit path module.

Shown in FIG. 9 is a more detailed drawing of an exemplary TPM 806 comprised of N channels. The TPM 806 includes an N-channel optical splitter 902 which splits a TMOC signal into a plurality N optical signals. The TMOC is an optical carrier signal that has been modulated using an RF signal (e.g., a microwave or millimeter wave RF signal). Each of the N optical signals resulting from the split are sometimes referred to herein as transmit ELOC signals. Each of the N transmit ELOC signals is respectively communicated to one of N transmit optical channels (TOCs) 903. In order to facilitate clarity of the disclosure, FIG. 9 shows only a single TOC 903. However, it should be understood that the TPM 806 will include N TOCs, the output of which are to be coupled to N ELPICs 110.

The ultimate purpose of each TOC 903 is to facilitate control over the phase and amplitude of an RF transmit signal which has been modulated on the optical carrier comprising the transmit ELOC signal. As such, each TOC 903 includes, a phase control ring 904, a switchable delay 906, and a variable optical attenuator (VOA) 908. Each of these devices is electronically controlled responsive to control signals (e.g. PCU control signals 805a received from PCU 804). These control signals have been intentionally omitted from FIG. 9 to facilitate greater clarity concerning the features of the TOC. However, it will be appreciated that each of these devices can be controlled by means of an analog or digital electronic control signal that is provided by a control device, such as PCU 804.

It should be noted that the particular order of the phase control ring 904, the switchable delay 906, and the VOA along the optical path of the TOC is not critical and other orderings of these devices are also acceptable. For example, the order of these three components along the optical path could be reversed. Optical waveguides can be used to facilitate communication of the transmit ELOC signal between the photonic devices along each channel path in the TPM 806.

The optical splitter 902 is a conventional passive optical power distribution device and is designed to distribute an incident optical beam into N optical beams. It should be appreciated that the optical splitter 902 can be any type of optical splitter that is of relatively low loss and suitable for use with the optical wavelengths employed in the system. Passive optical splitters as described herein are well known in the art and therefore will not be described here in detail.

Phase control rings are well-known in the art and therefore will not be described here in detail. Briefly however, it will be noted that the phase control ring 904 is a type of optical ring resonator. Ring resonators are well-known in the art and are commonly used for various purposes such as filters, modulators and so on. In the TOC shown in FIG. 9, the ring resonator is configured as an "all pass" design to exclusively facilitate phase control. In such configurations, the ring resonator will pass all optical wavelengths within a predetermined operating range without significant attenuation, and the predominant effect of the ring resonator upon the transmit ELOC signal will only be a phase shift effect as described herein.

A phase control ring is a relatively narrow-band device insofar as it will function to vary phase shift of optical signals only over a narrow range of optical wavelengths. In an optical ring resonator as described herein, phase variations can be introduced to an optical signal traversing the ring by dynamically varying the resonant condition of the ring. The phase variation that is produced in an optical ring resonator such as phase control ring 904 can be produced by a variety of known methods, all of which involve dynamically modifying the resonant condition of the ring resonator. For example, in a silicon nitride type of ring resonator a thermal variation can be used to vary the phase shift produced by the ring by means of a thermo-optic effect. In such a device, a change in temperature of the optical waveguide will result in a change in refractive index of the waveguide material, which in turn will produce a change in the resonant condition of the ring. This variation in the resonant condition of the ring will then produce the desired phase shift.

In the domain of silicon photonics, other known methods for varying the resonant condition of a ring resonator involve carrier injection into the optical waveguide. Such carrier injection can produce a desired variation in optical waveguide refractive index, and consequently in ring resonant condition. In a lithium niobate type of ring resonators, an electric field applied across the optical waveguide can cause a variation in the waveguide refractive index, which in turn will produce a variation in the resonant condition of the ring. In some scenarios, the phase control ring 904 is a thermally tuned ring resonator, with its resonance tuned to the wavelength of optical carrier used in the system. This type of ring resonator functions by changing the phase of the optical carrier with respect to the phase of the microwave or millimeter-wave sideband. As such the phase control ring 904 can facilitate variable phase adjustments within a predetermined range.

The predetermined phase tuning range of a phase control ring will vary with the particular design but will always be less than 360°. For example, in some scenarios a phase control ring as described herein will provide phase a phase adjustment range of between about 0° and 70°. In other scenarios, a phase adjustment ring can provide a phase shift adjustment range of between about 0° and 300°. In still other scenarios, a phase shift adjustment range of a phase control ring can be between about 0° and 350°.

Figure 11:
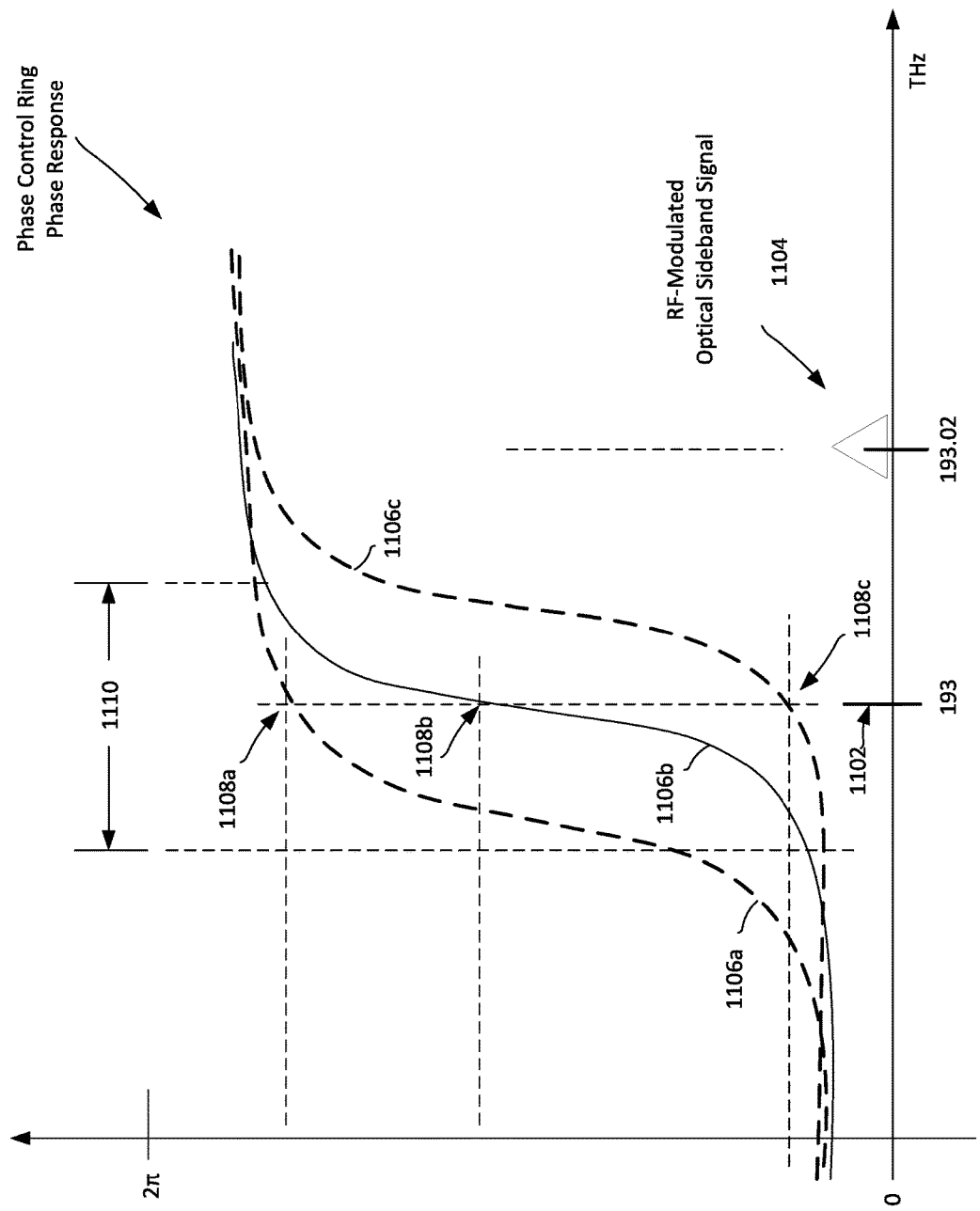
FIG. 11 is a plot which is useful for understanding an aspect of phase control using a phase control ring.

The function of the phase control ring 904 is illustrated in FIG. 11 which shows a scenario in which a 20 GHz microwave signal is modulated on a 193 THz optical carrier. The transmit ELOC signal in this scenario will comprise an optical carrier signal 1102, plus an optical sideband signal 1104 produced as a result of the modulation process. The optical sideband signal 1104 will contain the information comprising the transmit RF signal which was used to modulate the optical carrier. As shown in FIG. 11, a phase response curve 1106b of the phase control ring will include a dynamic region 1110 where the magnitude of the phase shift introduced by the ring is highly dependent on the frequency of the applied optical carrier signal. In the case of phase response 1106b, it can be observed that this dynamic region is approximately aligned with the frequency of the optical carrier 1102. However, controlled adjustments in the resonant condition of the phase control ring 904 will cause changes in the phase response of the ring. These changes will generally involve a shifting of the dynamic region 1110 along the frequency axis so that a variable selected phase shift is applied to an optical carrier signal 1102.

For example, in FIG. 11 it can be observed that a first resonant condition will result in a phase response curve 1106a, a second resonant condition will result in phase response curve 1106b, and a third resonant condition will result in a phase response curve 1106c. Note that the change in resonant condition will result in a change in the phase shift caused at the optical carrier frequency. Accordingly, a phase shift applied to an optical carrier signal 1102 will be different depending on the resonant condition of the ring. For example, in FIG. 11, optical carrier signal 1102 will experience a first phase shift 1108a when the resonant condition in the ring results in the phase shift curve 1106a, a second phase shift 1108b when the resonant condition of the ring results in the phase shift curve 1106b, and a third phase shift 1108c when the resonant condition of the ring results in the phase shift curve 1106c.

It can be observed in FIG. 11 that the dynamic region 1110 of the phase control ring 904 extends over a relatively narrow range of optical frequencies. In this frequency range relatively small changes in the resonant condition will substantially change the phase of a first optical signal in the frequency range of the dynamic region, without substantially affecting the phase of optical signals outside the frequency range of such region. For example, in FIG. 11 it can be observed that a phase variation can be applied to the optical carrier 1102 at 193 THz without significantly affecting the phase of the RF modulated optical sideband 1104 at 193.02 THz.

From the foregoing it can be appreciated that the phase control ring 904 can shift the phase of the optical carrier 1102 as compared to the phase of the RF-modulated optical sideband 1104. This characteristic is attributable to the relatively narrow bandwidth of the dynamic region 1110. Consequently, with the arrangement described herein, the phase of the optical carrier 1102 can be adjusted independently of the phase of the RF modulated optical sideband 1104. The result is that a phase difference can be selectively caused in each transmit ELOC signal as between the optical carrier and the RF signal-modulated optical sideband. Of course it should be understood that the frequency of the optical carrier and the microwave signal described in relation to FIG. 11 are provided merely by way of example and are not intended to limit the scope of the present disclosure in any way. Rather, the ALPIC can implemented for a wide range of optical carrier signals and microwave (or millimeter wave) RF signals, without limitation.

As noted above, a single phase control ring 904 will always provide less than 360° or 2π radians of phase shift. But it is advantageous in beam steering operation for each TOC 903 to have the ability to apply a full 360° or 2π radians of phase shift to the optical carrier component of each transmit ELOC signal. To ensure that each TOC can provide such a phase shift, a second phase control ring 904 could be added along the optical path to increase the range of phase control by a factor of two. However, in some scenarios a switchable delay element 906 can instead be provided along the optical path in the TOC. The switchable delay element 906 can selectively add 180° or π radians of delay along the optical path in the TOC 903. Accordingly, by coordinating the operation of the phase control ring 904 and the switchable delay element 906, a greater range of control can be achieved with relatively low power consumption.

As is known, pure beam-steering of phased arrays is achieved through true time delay of the signal applied to each antenna element, whereby the various antenna elements of an array receive delayed versions of the same signal. In a scenario disclosed herein, the phase control ring 904 adjusts the phase difference of the optical carrier with respect to the optical sideband and approximates beam-steering for small arrays, small angles, and small bandwidth signals. But a single ring based phase shifter does not give a full +/−π phase shift. Instead of using a second phase control ring, the switchable delay element 906 is provided which gives enough delay to correspond to a π phase shift of the RF signal. The switchable delay element 906 is a true time delay element and therefore does not adjust the relative phases between the optical carrier and the optical sidebands.

Optical delay elements are well-known in the art and the exact configuration of the switchable delay 906 is not critical. However, the device should be capable of selectively adding or inserting an optical delay of 180° or π radians in the optical path of the TOC in response to a control signal. In this regard it will be understood that the switchable delay 906 can change the path length when needed by increasing the path length by an amount equal to 180° or π radians at the wavelength of the optical carrier. In the scenario shown in FIG. 9, the switchable delay element is a conventional binary switch delay, which is well-known in the art and commonly used in fiber based optical delay systems. Still, it should be understood that other types of switchable optical delay lines now known or known in the future can be used without limitation.

One advantage of using a switchable delay element 906 as described is that it tends to have a lower power consumption as compared to the addition of a second phase control ring 904. A further advantage of this approach is that use of the switchable delay element can simplify the necessary control circuitry in the TOC 903 as compared to the use of two phase control rings. Of course, in a scenario where these factors are not a concern, a second phase ring 904 could be used instead of the switchable delay 906 to facilitate the full 360° or 2π radians of phase control.

The VOA is added to tune the amplitude of the transmit ELOC signal. VOA elements in the field of optics are well-known in the art and the exact configuration of the VOA 908 is not critical provided that it does not otherwise introduce unwanted phase variations in the optical carrier relative to the optical sideband. In a scenario shown in FIG. 9, the VOA can be comprised of a tunable arrangement whereby the amount of optical power passed through the device to the ELPIC 110 can be continuously varied over a predetermined range (e.g., 0 to 100%) in response to a control signal.

In some scenarios, the VOA 908 can comprise an interferometric device which operates by splitting an input optical signal (the transmit ELOC signal) into two optical paths 909a, 909b. Thereafter, a broadband phase difference will be introduced as between the transmit ELOC signal communicated along each path. For example, this broadband phase difference can be introduced by first and second refractive index tuning elements which are respectively disposed along each optical path. These refractive index tuning element can cause selective variations in the refractive index along each path so as to produce the desired phase shift to signals traversing each path. The refractive index variations can be implemented using a thermo-optic effect, carrier injection, electro-optic effect or any other suitable tuning mechanism. When the signals traversing the two paths are subsequently recombined, the amount of phase difference introduced between the two paths will determine the extent to which the signals will constructively add, or destructively subtract from each other.

It should be noted that in an interferometric type VOA device as described, the broadband phase shift introduced is different from the narrowband phase shift operations performed in the phase control ring 904. As explained with reference to FIG. 11, the narrowband phase shift introduced in the phase control ring 904 will produce a phase shift in the optical carrier 1102 while not affecting the phase of the RF modulated optical sideband signal 1104. This results in a selectively variable phase difference between the carrier and the optical sideband. In contrast, the broadband phase shift introduced in an interferometric type VOA 908 will concurrently introduce a phase shift into both the optical carrier signal and the optical sideband produced as a result of the RF modulation. Since phase variations are concurrently introduced to both signals in the interferometric type of VOA 908, there will be no phase difference or variation caused as between the optical carrier signals and the optical sideband signal.

Other types of VOA devices can also be used for variably attenuating the modulated optical signal. For example, in some scenarios an electro-absorption type of VOA can be used in which an absorption or attenuation of a certain optical wavelengths in an optical waveguide is varied in response to changes in an applied electric field. Other alternatives to varying attenuation can involve selectively flooding the optical waveguide with electrons to increase attenuation. The specific mechanism used to perform the variable attenuation function is not critical and any type of VOA whether now known or known in the future can be used for this purpose.

As described herein with reference to FIG. 6, each ELPIC 110 includes a photodetector (optical demodulator). The photodetector converts the phase and amplitude adjusted modulated RF signal contained in the transmit ELOC, back to an RF signal. Photodetectors as referenced herein are well known in the art and therefore will not be described detail. However, it should be understood that such devices will commonly include a solid state semiconductor element which varies an electric current responsive to the incident optical signal. As is known, a continuous wave optical carrier signal will be converted by the photodetector to a DC output signal. But an optical carrier and its RF modulated optical sideband 1104 will interfere with each other at the photodetector so that an alternating electrical current variation is introduced in the DC output of the photodetector. This alternating electrical current variation will correspond to the original modulated RF signal, phase shifted and gain adjusted in accordance with the operations of the TOC. The resulting RF signal has been sometimes referred to herein as the transmit element lever modulated RF (ELMRF) signal which forms the output of each ELPIC.

The TPM 806 is advantageously configured to facilitate selective independent adjustment of both the amplitude and RF phase of the modulated RF signal contained in each of the N transmit ELOC signals as they are communicated along each of the N paths defined by the TOCs 903. After passing through a respective TOC, each of the N transmit ELOC signals is respectively communicated to one of the ELPICs 110. In each ELPIC a photodetector extracts the RF signal information from its respective transmit ELOC signal and produces the phase and gain adjusted RF signal (i.e., the transmit ELMRF signal) as an output.

Each of these N independent RF signals are then respectively coupled to one of the N antenna elements. Notably, each of these RF signals will have a RF phase and amplitude that is independently controlled in accordance with the adjustments made in its respective TOC 903. These RF signals are then respectively used to feed the N antenna elements so as to form a desired antenna beam.

As shown in FIG. 9 an optical diplexer 910 can be provided for each TOC 903. In some scenarios, the diplexer can be a WDM type diplexer. If used, the purpose of the diplexer 910 is to facilitate full duplex communications by providing concurrent communication of both an transmit ELOC signal and a receive ELOC signal on a single optical waveguide 130. However, embodiments are not limited in this regard and in some scenarios separate optical waveguides 130 can instead be utilized respectively for the transmit and receive ELOC signals. As a further alternative, the system can be set up for half duplex operation such that the transmit and receive ELOC signals are communicated over the optical waveguide 130 at different times.

Figure 10:
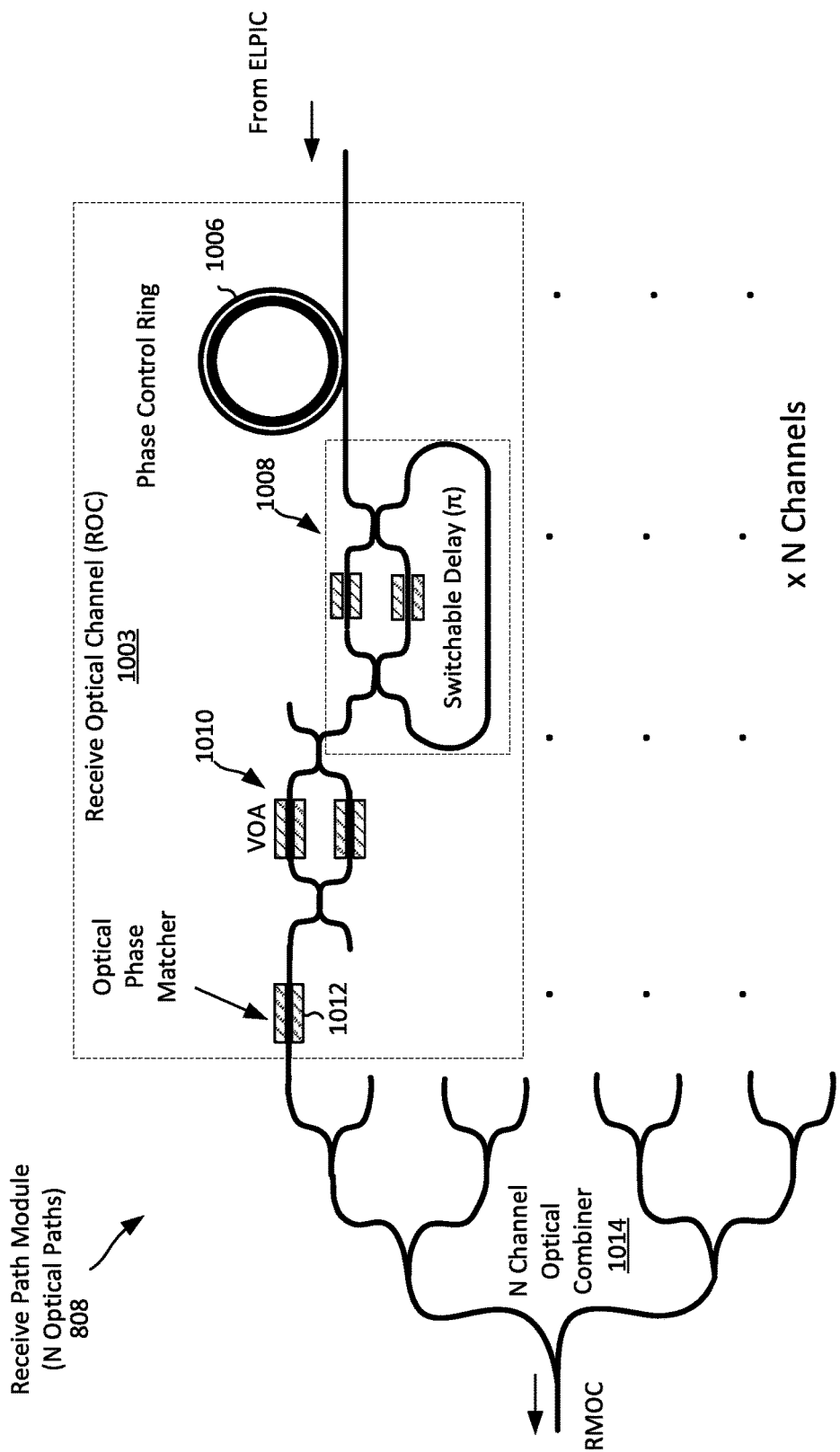
FIG. 10 is a detailed block diagram of a receive path module.

Shown in FIG. 10 is a more detailed drawing of an exemplary RPM 808. The RPM 808 includes N receive optical channels (ROCs) 1003. In order to facilitate clarity of the disclosure, FIG. 10 shows only a single ROC 1003 connected to its respective antenna element 1002. However, it should be understood that the RPM 808 will actually include N ROCs 1003 that are optically coupled to the N ELPICs 110. As noted above, this communication can in some scenarios be facilitated by means of an optical diplexer 910.

Within each ELPIC 110, an RF receive signal from a corresponding antenna element is communicated to an optical modulator provided in the ELPIC. The optical modulator utilizes the RF receive signal from the antenna element 1002 as an exciter signal to excite or modulate an optical carrier signal. The resulting signal is referred to herein as a receive ELOC signal. As is known, an optical modulator will produce a resulting output which includes the original optical subcarrier and an optical sideband signal, which is offset in frequency from the frequency of the optical carrier.

The ultimate purpose of each ROC 1003 is to facilitate control over the phase and amplitude of the RF receive signal which has been modulated on the optical carrier at each ELPIC. Within the ROC 1003, this control is asserted by using optical processing means similar to those described herein with respect to the TOC 903. As such, each ROC 1003 includes, a phase control ring 1006, a switchable delay 1008, a variable optical attenuator (VOA) 1010, and an optical phase matcher 1012. Each of these devices is electronically controlled using suitable analog or digital control signals. For example, these devices may be controlled by using PCU control signals 805b received from a PCU 804. The control signals for the phase control ring 1006, the switchable delay 1008, the VOA 1010, and the optical phase matcher 1012 have been intentionally omitted from FIG. 10 to facilitate greater clarity of the disclosure.

It should be noted that within the ROC 1003, the particular order of the phase control ring 1006, the switchable delay 1008, and the VOA 1010 along the optical path is not critical and other orderings of these devices are also acceptable. For example, the order of these components along the optical path could be reversed. Optical waveguides are used to facilitate communication of the RMOS signal between the various photonic devices along each channel path in the RPM 808. The characteristics of the phase control ring 1006, the switchable delay 1008, and the VOA 1010 are similar to the phase control ring 904, switchable delay 906 and VOA 908. Accordingly, the description of these elements provided above is sufficient for understanding the phase control ring 1006, the switchable delay 1008 and the VOA 1010.

The N receive ELOC signals are respectively communicated from the ELPICs 110 to the ROC 1003 through ELOWs (e.g., ELOWs 130). Within each ROC 1003 a phase difference is selectively controlled as between an optical carrier and optical sideband comprising each ELOC. Likewise, an amplitude of each receive ELOC signal is selectively controlled. The amplitude and phase adjustments in each channel are applied independently in each ROC so that different phase and amplitude adjustments can be applied in each TOC. For example, these values can be independently controlled in response to control signals 805b received from PCU 804. These adjustments can be used so as to steer and form a desired receive antenna beam for receive operations.

After having the necessary phase and amplitude adjustments applied to facilitate any necessary beam-control operations, the N receive ELOC signals are combined into a single receive modulated optical output signal (RMOC) by the N-channel optical combiner 1014. The N-channel optical combiner can be a conventional passive optical power combiner which is designed to combine a plurality of N incident optical beam into a single optical beam. It should be appreciated that the optical combiner 1014 can be any type of optical combiner that is of relatively low loss and suitable for use with the optical wavelengths employed in the system. Passive optical combiners as described herein are well known in the art and therefore will not be described here in detail.

The purpose of the optical phase matcher 1012 is to ensure that the optical carrier portion of each receive ELOC signal from each TOC is combined constructively in the N-channel optical combiner. Recall that each receive ELOC signal traversing each ROC 1003 will actually comprise an optical carrier and an optical sideband signal produced as a result of the optical modulator function. For combining purposes, it is necessary to consider the phase of the optical carrier in each ROC path as compared to a phase of the optical carriers in the other TOC paths. In the transmit direction, this is not an issue because there is no need to re-combine the optical carriers. But in the receive direction, a failure to properly align the phase of the optical carriers comprising each receive ELOC signal will result in destructive interference when the signals are combined in the N channel optical combiner 1014.

The phase of an RF signal that is ultimately reproduced from each receive ELOC signal is based on a phase difference between the optical carrier and the optical sideband. So it is important that the optical phase matcher 1012 preserves this important phase information while matching the phase of the optical carrier of each receive ELOC signal. Accordingly, the design of the optical phase matcher 1012 is advantageously selected so that it will concurrently result in an approximately equal phase shift in both the optical carrier and its associated optical sideband signal contained in each receive ELOC signal. In this regard, the optical phase matcher 1012 is preferably a broadband design capable of facilitating approximately equal phase shifts in both the optical carrier and the optical sideband of each receive ELOC signal traversing through each ROC.

The exact design of such optical phase matcher 1012 is not critical provided that it is capable of performing broadband phase shifts as described herein. Exemplary techniques that can be used for affecting such broadband phase shifts are known in the art and therefore will not be described here in detail. However, such techniques can involve the use of a refractive index tuning element disposed along the optical path. In such elements, selective variations in the refractive index can produce the desired phase shift to signals traversing each path. The refractive index variations can be implemented using a thermo-optic effect, carrier injection, electro-optic effect or any other suitable tuning mechanism.

As with the optical carrier portion of the receive ELOC signal, the optical sideband portion will also be combined in the N channel optical combiner. However, in the case of the N optical sideband signals, the phase offsets respectively introduced in each of the ROCs 1003 will result in a controlled combing operation that facilitates beam steering in the receive direction. Phased array techniques to facilitate such beamforming are well known in the art and therefore will not be described here in detail. Likewise, gain offsets respectively introduced in each of the N ROCs can be used for receive channel beam shaping operations (e.g. sidelobe suppression and beam shaping) in accordance with known phased array techniques.

At a remote receiver (not shown) the single RMOC signal output from the combiner 1014 can be coupled to a photo-detector to extract the combined receive channel RF signal information. The RF signal is then processed further in accordance with conventional signal processing methods. For example, the received signal can be demodulated or processed in a signal processing system associated with RF transceiver to extract data which has been communicated by means of the RF signal.

The ROC architecture shown in FIG. 10 assumes a single sideband modulation, which can be facilitated by utilizing a conventional Mach-Zehnder modulator (MZM) as the optical modulator in the ELPIC 110. But in some scenarios, it can be advantageous to instead use a conventional ring-based modulator in the receive path rather than an MZM type modulator. For example, a ring-based modulator in the receive path can be advantageous for purposes of facilitating improved receiver sensitivity performance.

Although a ring-based modulator can have certain advantages, one potentially negative aspect is that these types of modulators will generally produce dual sideband modulation. In other words, a receive ELOC signal produced using a ring-based modulator will have an optical sideband both above and below the frequency of the optical carrier comprising each receive ELOC signal. Such a dual sideband signal can present some problems with respect to the phase control ring 1006. A ring-based phase shifters such as phase control ring 1006 generally will not work well with dual sideband modulation as such phase shifters are narrowband devices and can introduce distortion into the lower sideband of the receive ELOC signal.

In order to overcome this problem various solutions are possible. For example, in one scenario, a dual sideband receive ELOC signal can be filtered down to a single sideband. The optical filter component can be disposed in FIG. 10 before the input to the phase control ring 1006 so as to remove the unwanted sideband signal. In such a scenario, a ring-based phase shifter arrangement (i.e., phase control ring 1006) can provide satisfactory results. Alternatively, the receive ELOC signal from an ELPIC 110 can be allowed to remain as a dual sideband signal, in which case a multi-ring phase shifter (not shown) can be utilized such that the phase of both optical sidebands is shifted relative to the optical subcarrier. Also, other system architectures can be implemented that do not use ring-based phase shifters, and these architectures can be more suitable for systems that use ring modulators producing dual sideband modulation. Accordingly, the methods and systems disclosed herein are not limited to the architecture shown in FIG. 10.

The ALPIC architecture shown in FIGS. 8-11 is one example of an optical processing architecture that can be used to facilitate phase and gain adjustments in an ALPIC. However, it should be understood that the approach shown in FIGS. 8-11 is not intended to be limiting of the various architectures which are contemplated. In other scenarios, different architectures are also possible and all such architectures are contemplated for use herein, whether now known or known in the future. Further, it should be noted that in other scenarios the functionality associated with each TOC 903 and ROC 1003 can be shifted from the ALPIC to the ELPICs. In such a scenario, the phase and gain control of the ELOC signals for each antenna element can be optically performed at each of the ELPICs in a distributed fashion. In such scenarios, the ALPIC can function primarily as an optical signal distribution and/or consolidation hub for TMOC, RMOC and ELOC signals.

Reference throughout this specification to features, advantages, or similar language does not imply that all of the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for feeding a plurality of antenna elements of an array antenna, comprising:
    receiving at a photonic substrate at least one transmit modulated optical carrier (TMOC) signal;
    communicating the TMOC signal to an array level photonic integrated circuit (ALPIC) disposed on the photonic substrate;
    using the ALPIC to extract a plurality of transmit element-level optical carrier (ELOC) signals from the TMOC;
    using a plurality of optical waveguides to optically distribute the plurality of transmit ELOC signals from the ALPIC to a plurality of conversion locations distributed on the photonic substrate;
    using photodetectors respectively provided at each of the plurality of conversion locations to convert each of the transmit ELOC signals to a transmit element-level modulated radio frequency (ELMRF) signal;
    coupling the transmit ELMRF signal from each photodetector respectively to one of the plurality of antenna elements;
    performing at least one antenna control operation in the optical domain to selectively cause a variation in at least one of a phase and an amplitude in at least one of the plurality of transmit ELMRF signals; and
    communicating at least one antenna control signal for specifying the antenna beam control operation from a remote location to a local control element using a common optical fiber through which the TMOC signal is also communicated.

2. The method according to claim 1, further comprising coordinating the plurality of conversion locations so that each photodetector is disposed proximate to one of the plurality of antenna elements to which the transmit ELMRF signal generated in the photodetector is coupled.

3. The method according to claim 2, further comprising coupling the transmit ELMRF from each photodetector respectively to one of the plurality of antenna elements disposed in or on the photonic substrate.

4. The method according to claim 1, wherein the plurality of optical waveguides optically distribute the plurality of transmit ELOC signals through a thickness of the optical substrate, from the ALPIC disposed proximate to a first major surface of the photonic substrate, to the conversion locations disposed proximate to a second major surface of the photonic substrate and opposed from the first major surface.

5. The method according to claim 4, wherein the plurality of antenna elements are disposed on or adjacent to the second major surface of the photonic substrate.

6. The method according to claim 2, wherein the optical waveguides optically distribute the plurality of transmit ELOC signals from the ALPIC disposed proximate to a first major surface of the photonic substrate, to the conversion locations disposed on or adjacent to the first major surface.

7. The method according to claim 2, wherein the coupling step further comprises using a radio frequency (RF) waveguide to communicate the transmit ELMRF signals through a thickness of the photonic substrate, from the conversion locations to an opposing major surface of the photonic substrate.

8. The method according to claim 1, wherein an optical modulator is provided at each of the conversion locations, and the further comprising
    communicating from the plurality of antenna elements respectively to the plurality of optical modulators a plurality of receive ELMRF signals;
    using the plurality of optical modulators to convert the plurality of receive ELMRF signals to a plurality of receive ELOC signals; and
    performing at least one optical processing operation on the plurality of receive ELOC signals.

9. The method according to claim 8, further comprising performing at least one operation to facilitate antenna beam formation by selectively varying at least one of a phase and an amplitude of at least one of the receive ELMRF signals.

10. The method according to claim 8, wherein the at least one optical processing operation performed on the plurality of receive ELOC signals comprises at least one antenna beam forming operation to selectively cause a variation in at least one of a phase and an amplitude in at least one of the ELMRF signals which has been modulated onto the receive ELOC signal.

11. The method according to claim 8, wherein the at least one optical processing operation comprises an optical combining operation whereby the plurality of receive ELMRF signals are combined to form a composite receive modulated optical carrier (RMOC) signal.

12. A method for feeding a plurality of antenna elements of an array antenna, comprising:
   receiving at a photonic substrate at least one transmit modulated optical carrier (TMOC) signal;
   communicating the TMOC signal to an array level photonic integrated circuit (ALPIC) disposed on the photonic substrate;
   using the ALPIC to extract a plurality of transmit element-level optical carrier (ELOC) signals from the TMOC;
   using a plurality of optical waveguides to optically distribute the plurality of transmit ELOC signals from the ALPIC to a plurality of conversion locations distributed on the photonic substrate;
   using photodetectors respectively provided at each of the plurality of conversion locations to convert each of the transmit ELOC signals to a transmit element-level modulated radio frequency (ELMRF) signal; and
   coupling the transmit ELMRF from each photodetector respectively to one of the plurality of antenna elements disposed on an RF substrate disposed adjacent to the photonic substrate, and formed of a different substrate material as compared to the photonic substrate.

13. The method according to claim 12, further comprising arranging the photonic substrate and the RF substrate so that they are included among a plurality of substrate layers which define a stack.

14. An optical interposer for a plurality of antenna elements of an array antenna, comprising:
   a photonic substrate on which is disposed:
      an optical interface configured to facilitate an optical communication link with a remote optical signal source through an optical fiber;
      an array level photonic integrated circuit (ALPIC) which is optically coupled to the optical interface, the ALPIC configured to extract a plurality of transmit element-level optical carrier (ELOC) signals from a transmit modulated optical carrier (TMOC) signal received at the optical interface;
      a plurality of photodetectors disposed at a plurality of conversion locations distributed on the photonic substrate;
      a plurality of element-level optical waveguides configured to optically distribute the plurality of transmit ELOC signals from the ALPIC to the plurality of photodetectors;
      the plurality of photodetectors configured to convert each of the transmit ELOC signals to a transmit element-level modulated radio frequency (ELMRF) signal, and a plurality of RF couplings are provided to communicate the transmit ELMRF signals respectively from the plurality of photodetectors to the plurality of antenna elements; and
      wherein the optical interface is configured to receive at least one antenna control signal communicated through the optical fiber from the remote optical signal source, and one or more optical control elements responsive to the antenna control signal are configured to perform in the optical domain at least one antenna beam control operation comprising a selective variation in at least one of a phase and an amplitude in at least one of the plurality of transmit ELMRF signals.

15. The optical interposer according to claim 14, wherein the plurality of conversion locations are distributed on said photonic substrate so that each photodetector is disposed proximate to one of the plurality of antenna elements to which the transmit ELMRF signal from the photodetector is coupled.

16. The optical interposer according to claim 15, wherein the plurality of antenna elements are disposed in or on the photonic substrate.

17. The optical interposer according to claim 15, wherein the element-level optical waveguides extend from the ALPIC disposed proximate to a first major surface of the photonic substrate, to the conversion locations disposed on or adjacent to the first major surface.

18. The optical interposer according to claim 15, wherein the plurality of RF couplings comprise radio frequency (RF) waveguides which extend through a thickness of the photonic substrate, from the conversion locations to an opposing major surface of the photonic substrate.

19. The optical interposer according to claim 14, further comprising an optical modulator provided at each of the conversion locations, configured to convert a plurality of receive ELMRF signals to a plurality of receive ELOC signals;
   a plurality of receive optical waveguides disposed on the substrate configured to couple each of the receive ELOC signals to the ALPIC; and
   wherein the ALPIC is configured to perform at least one optical processing operation on the plurality of receive ELOC signals.

20. The optical interposer according to claim 19, further comprising at least one of a phase and a gain control element configured to facilitate antenna receive beam formation by selectively varying at least one of a phase and an amplitude of at least one of the receive ELMRF signals.

21. The optical interposer according to claim 19, wherein the optical processing operation performed on the plurality of receive ELOC signals comprises at least one antenna beam forming operation in the optical domain to selectively cause a variation in at least one of a phase and an amplitude in at least one of the receive ELMRF signals which has been modulated onto a receive ELOC signal.

22. The optical interposer according to claim 19, wherein the ALPIC comprises at least one optical combiner and the optical processing operation performed on the plurality of receive ELOC signals comprises an optical combining operation whereby the plurality of receive ELMRF signals are combined to form a composite receive modulated optical carrier (RMOC) signal.

23. The optical interposer according to claim 14, wherein the plurality of element-level optical waveguides are integrated with the photonic substrate.

24. The optical interposer according to claim 14, wherein the plurality of element-level optical waveguides are comprised of optical fibers secured to the photonic substrate.

25. An optical interposer for a plurality of antenna elements of an array antenna, comprising:
   a photonic substrate on which is disposed:
   an optical interface configured to facilitate an optical communication link with a remote optical signal source;
   an array level photonic integrated circuit (ALPIC) which is optically coupled to the optical interface, the ALPIC configured to extract a plurality of transmit element-level optical carrier (ELOC) signals from a transmit modulated optical carrier (TMOC) signal received at the optical interface;
   a plurality of photodetectors disposed at a plurality of conversion locations distributed on the photonic substrate;

a plurality of element-level optical waveguides configured to optically distribute the plurality of transmit ELOC signals from the ALPIC to the plurality of photodetectors;
the plurality of photodetectors configured to convert each of the transmit ELOC signals to a transmit element-level modulated radio frequency (ELMRF) signal, and a plurality of RF couplings are provided to communicate the transmit ELMRF signals respectively from the plurality of photodetectors to the plurality of antenna elements; and
wherein the plurality of antenna elements are provided on an RF substrate disposed adjacent to the photonic substrate, and formed of a different substrate material as compared to the photonic substrate.

26. The optical interposer according to claim 25, wherein the photonic substrate and the RF substrate are included among a plurality of substrate layers which define a stack.

27. An optical interposer for a plurality of antenna elements of an array antenna, comprising:
a photonic substrate on which is disposed:
an optical interface configured to facilitate an optical communication link with a remote optical signal source;
an array level photonic integrated circuit (ALPIC) which is optically coupled to the optical interface, the ALPIC configured to extract a plurality of transmit element-level optical carrier (ELOC) signals from a transmit modulated optical carrier (TMOC) signal received at the optical interface;
a plurality of photodetectors disposed at a plurality of conversion locations distributed on the photonic substrate;
a plurality of element-level optical waveguides configured to optically distribute the plurality of transmit ELOC signals from the ALPIC to the plurality of photodetectors;
the plurality of photodetectors configured to convert each of the transmit ELOC signals to a transmit element-level modulated radio frequency (ELMRF) signal, and a plurality of RF couplings are provided to communicate the transmit ELMRF signals respectively from the plurality of photodetectors to the plurality of antenna elements; and
wherein the plurality of element-level optical waveguides extend through a thickness of the optical substrate, from the ALPIC disposed proximate to a first major surface of the photonic substrate, to the conversion locations disposed proximate to a second major surface of the photonic substrate and opposed from the first major surface.

28. The optical interposer according to claim 27, wherein the plurality of antenna elements are disposed on or adjacent to the second major surface of the photonic substrate.

29. An optical interposer for a plurality of antenna elements of an array antenna, comprising:
a photonic substrate on which is disposed:
a plurality of optical modulators disposed at a plurality of conversion locations distributed on the photonic substrate, each optical modulator configured to convert a receive element-level modulated radio frequency (ELMRF) signal to a receive element-level optical carrier (ELOC) signal;
a plurality of RF couplings provided to communicate the receive ELMRF signals respectively from a plurality of antenna elements to the plurality of optical modulators;
a plurality of element-level optical waveguides respectively configured to optically communicate the plurality of receive element-level optical carrier (ELOC) signals from the plurality of optical modulators to an array-level photonic integrated circuit (ALPIC), the ALPIC configured to perform at least one optical processing operation on the plurality of receive ELOC signals;
an optical combiner configured to combine the plurality of receive ELOC signals to form a receive modulated optical carrier (RMOC) signal; and
an optical interface configured to communicate the RMOC signal to a remote optical signal receiver through an optical fiber;
wherein the optical interface is configured to receive at least one antenna control signal communicated through the optical fiber from a remote antenna control unit, and one or more optical control elements on the photonic substrate are responsive to the antenna control signal, the optical control elements configured to perform in the optical domain at least one antenna beam control operation responsive to the at least one antenna control signal, and wherein the at least one antenna beam control operation comprises a selective variation in at least one of a phase and an amplitude of at least one of the plurality of receive ELMRF signals.

30. The optical interposer according to claim 29, wherein the plurality of conversion locations are distributed on said photonic substrate so that each of the optical modulators is disposed proximate to one of the plurality of antenna elements from which it receives the receive ELMRF signal.

31. A method for beamforming with an array antenna comprised of a plurality of antenna elements, comprising:
coupling a receive element-level modulated radio frequency (ELMRF) signal from each of a plurality of antenna elements to each of a plurality of optical modulators respectively disposed at a plurality of conversion locations on a photonic substrate;
using the plurality of optical modulators to respectively convert each of the receive ELMRF signals to a corresponding receive element-level optical carrier (ELOC) signal;
using a plurality of optical waveguides disposed on the photonic substrate to optically communicate the plurality of receive ELOC signals from the plurality of optical modulators to an array-level photonic integrated circuit (ALPIC) disposed on the photonic substrate;
using the ALPIC to perform one or more optical processing operations involving the plurality of receive ELOC signals;
performing at least one antenna beam control operation in the optical domain to selectively cause a variation in at least one of a phase and an amplitude in at least one of the plurality of receive ELMRF signals; and
communicating at least one antenna control signal for specifying the antenna beam control operation from a remote location to a local control element on the photonic substrate using a common optical fiber through which the TMOC signal is also communicated.

32. A method for feeding a plurality of antenna elements of an array antenna, comprising:
receiving at a photonic substrate at least one transmit modulated optical carrier (TMOC) signal;
communicating the TMOC signal to an array level photonic integrated circuit (ALPIC) disposed on the photonic substrate;

using the ALPIC to extract a plurality of transmit element-level optical carrier (ELOC) signals from the TMOC;

using a plurality of optical waveguides to optically distribute the plurality of transmit ELOC signals from the ALPIC to a plurality of conversion locations distributed on the photonic substrate;

using photodetectors respectively provided at each of the plurality of conversion locations to convert each of the transmit ELOC signals to a transmit element-level modulated radio frequency (ELMRF) signal;

coupling the transmit ELMRF signal from each photodetector respectively to one of the plurality of antenna elements;

performing at least one antenna control operation to selectively cause a variation in at least one of a phase and an amplitude in at least one of the plurality of transmit ELMRF signals; and communicating at least one antenna control signal for specifying the antenna beam control operation from a remote location to a local control element using a common optical fiber through which the TMOC signal is also communicated.

\* \* \* \* \*